United States Patent
Partain et al.

(10) Patent No.: US 8,036,435 B2
(45) Date of Patent: Oct. 11, 2011

(54) CANCER DETECTION, DIAGNOSIS, STAGING, TREATMENT PLANNING, DELIVERY, AND MONITORING USING X-RAY ATTENUATION COEFFICIENT DISTRIBUTIONS

(75) Inventors: Larry Partain, Los Altos, CA (US); Stavros Prionas, Menlo Park, CA (US); John Boone, Folsom, CA (US)

(73) Assignee: Varian Medical Systems, Inc., Palo Alto, CA (US)

( * ) Notice: Subject to any disclaimer, the term of this patent is extended or adjusted under 35 U.S.C. 154(b) by 1045 days.

(21) Appl. No.: 11/864,856

(22) Filed: Sep. 28, 2007

(65) Prior Publication Data

US 2009/0087045 A1 Apr. 2, 2009

(51) Int. Cl.
*G06K 9/00* (2006.01)
(52) U.S. Cl. .......................................... 382/128; 382/131
(58) Field of Classification Search ........... 382/128–132
See application file for complete search history.

(56) References Cited

U.S. PATENT DOCUMENTS

| | | | | |
|---|---|---|---|---|
| 4,126,787 A * | 11/1978 | Hounsfield | ....................... | 378/14 |
| 4,219,876 A * | 8/1980 | Mizutani et al. | ................. | 378/15 |
| 4,233,507 A * | 11/1980 | Volz | ................................. | 378/18 |
| 5,115,394 A * | 5/1992 | Walters | ........................ | 382/131 |
| 5,943,434 A * | 8/1999 | Schwarz | ........................ | 382/131 |
| 6,399,951 B1* | 6/2002 | Paulus et al. | .............. | 250/370.13 |
| 6,561,695 B2* | 5/2003 | Proksa | .......................... | 378/207 |
| 6,770,893 B2* | 8/2004 | Nelson | ....................... | 250/458.1 |
| 6,987,831 B2* | 1/2006 | Ning | .............................. | 378/37 |
| 7,715,522 B2* | 5/2010 | Goto et al. | ....................... | 378/16 |
| 7,869,860 B2* | 1/2011 | Kinahan et al. | ............... | 600/425 |
| 2007/0269000 A1 | 11/2007 | Partain et al. | | |
| 2010/0054571 A1* | 3/2010 | Kojima et al. | ................. | 382/131 |

OTHER PUBLICATIONS

Yates et al., The Practice of Statistics, W. H. Freeman, New York, 1999.
Burgess, Journal of the Optical Society of America, 1999, vol. 16, pp. 633-646.

* cited by examiner

*Primary Examiner* — Manav Seth
(74) *Attorney, Agent, or Firm* — Houst Consulting

(57) ABSTRACT

A method of analyzing a volumetric data set obtained by an imaging system from an object is provided includes defining a first region of interest comprising a population of voxels of a first tissue part of the object to obtain a first distribution of radiation attenuation coefficient values, defining a second region of interest comprising a sample of voxels of a second tissue part of the object to obtain a second distribution of radiation attenuation coefficient values, and distinguishing the second tissue from the first tissue using the properties of the first and second distributions of radiation attenuation coefficients.

24 Claims, 15 Drawing Sheets

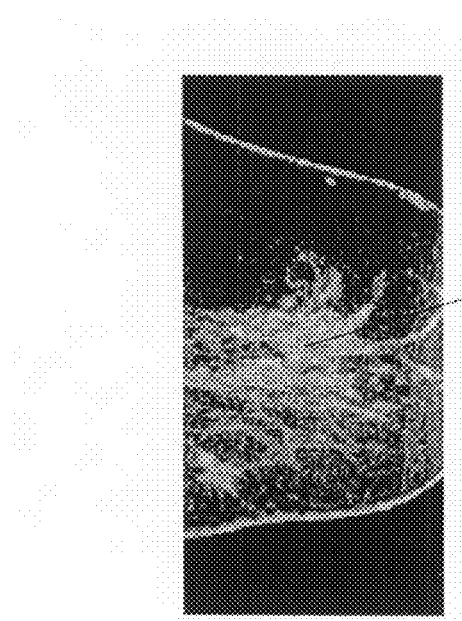 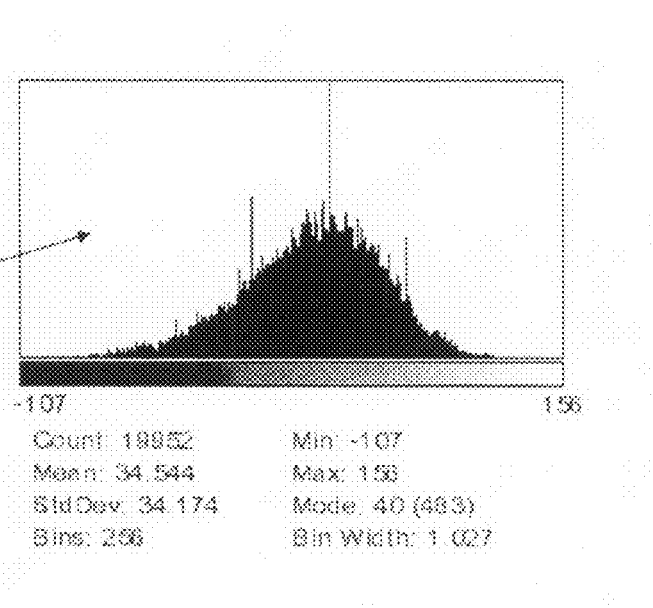
Fig. 8A
FIG. 8B
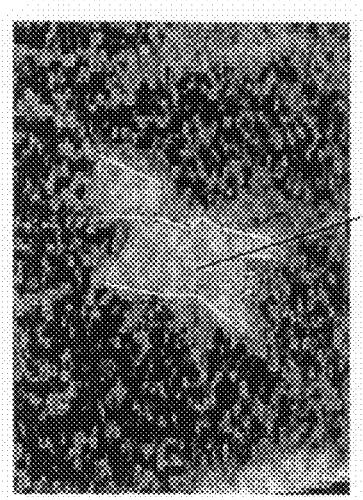 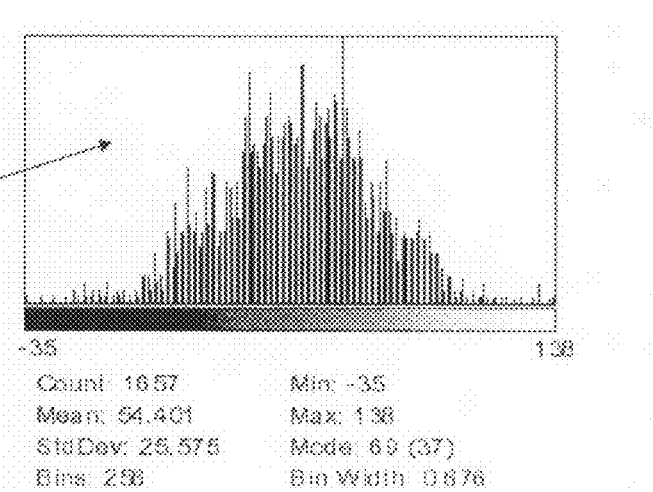
FIG. 9A
FIG. 9B

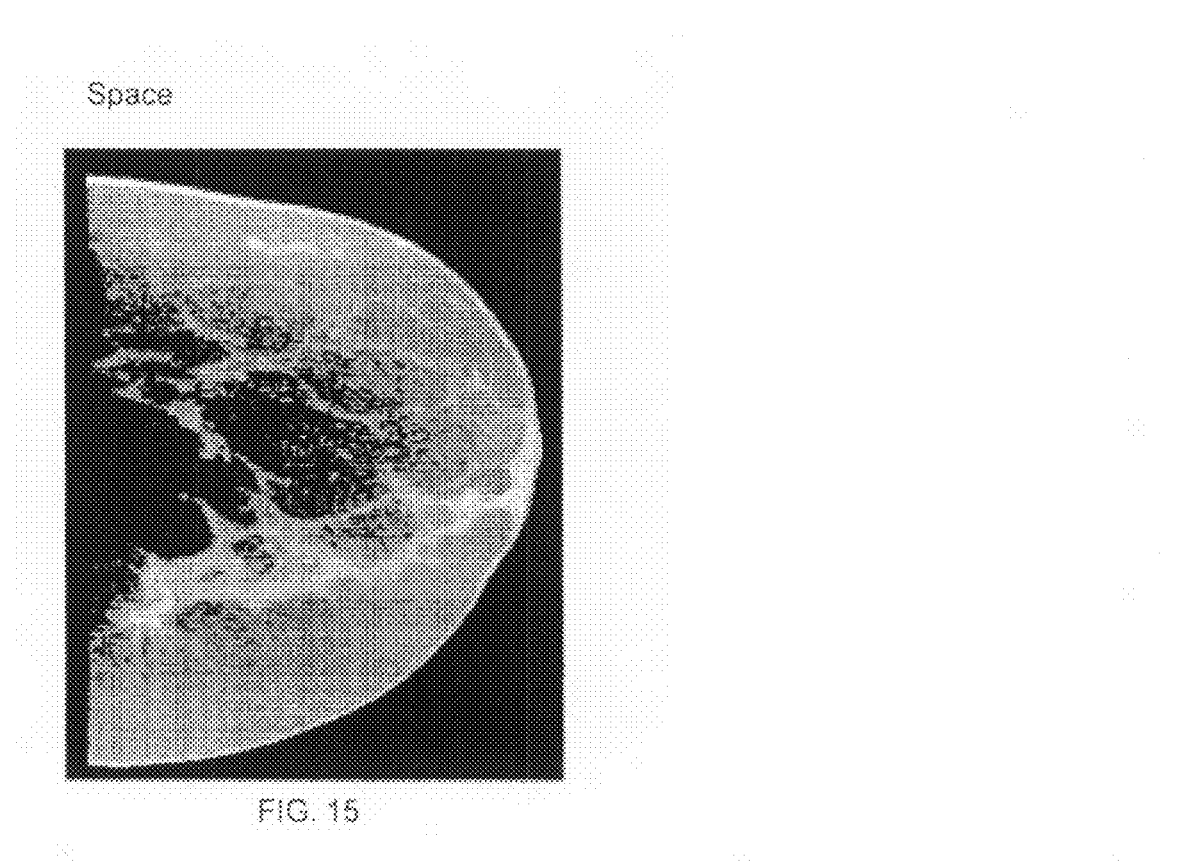
FIG. 15
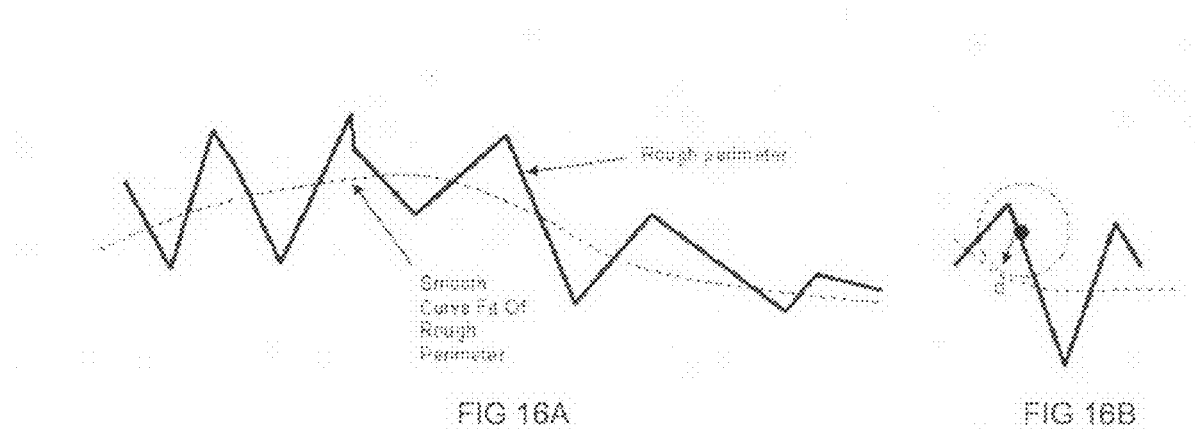
FIG 16A
FIG 16B

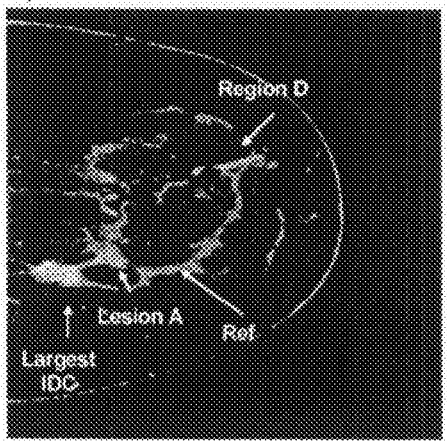
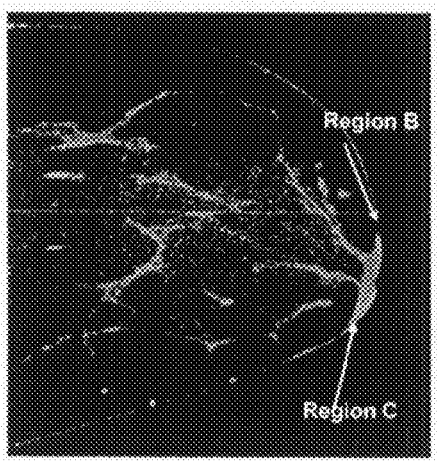
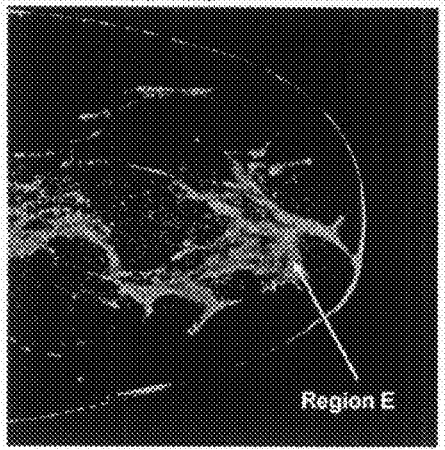
FIG. 17A  Slice 135  FIG. 17B
FIG. 17C  Slice 105  FIG. 17D
FIG. 17E  Slice 123  FIG. 17F

CANCER DETECTION, DIAGNOSIS, STAGING, TREATMENT PLANNING, DELIVERY, AND MONITORING USING X-RAY ATTENUATION COEFFICIENT DISTRIBUTIONS

TECHNICAL FIELD

This invention relates in general to medical imaging and treatment and in particular to cancer detection, diagnosis, staging, treatment planning, delivery, and monitoring using x-ray attenuation coefficient distributions.

BACKGROUND

X-ray tomographic, three-dimensional (3D) volumetric image data set acquisition apparatuses, and methods to translate these data into voxel matrices of X-ray attenuation values are known. The results are generally presented as various two-dimensional (2D) slice images of relative contrast of X-ray attenuation to provide geometrical and structural information about the object under investigation. Typically, the diagnostic or treatment targeting or other disease management activities only make use of the geometry and structure contrast of slice images. The shapes of the matrix voxels are generally asymmetric with relatively small dimensions (high spatial resolution) in the (x, y) plane perpendicular to the axis of rotation, and a larger dimension (lower spatial resolution) in the z-direction parallel to the axis of rotation. The ratio of the largest-to-smallest voxel dimension often exceeds a factor of four. The result is voxels that look more like rectangular soda straws than cubes. In digital tomosynthesis, this elongation of the z-dimension is even more significant due to the limited geometry directions from which the measured data are acquired.

It is known that X-ray attenuation is primarily a result of three types of interactions, namely photoelectric absorption, Compton scattering, and pair production. All the interactions have dependencies on the incident X-ray photon energy, object atomic number, and object mass density. Thus tomography determined X-ray attenuation values for voxels are an integral, complex weighted "average" over the atomic numbers, mass densities, and the energy distribution of the incident X-rays. The energy distribution of an incident X-ray changes with the distance the X-ray beam has to penetrate the object to reach the voxel being measured. In computed tomography, the resulting voxel attenuation values are typically calibrated using the average X-ray attenuation of water as the zero reference and free space attenuation as a value of minus 1000, expressed in Hounsfield units (HU).

Most recently, cone beam computed tomography is used to provide volumetric HU data sets with voxels of more symmetric dimensions in all three directions. The largest dimension can be in the range of 0.3 mm or larger, and the asymmetry ratio values can be less than two. Micro computed tomography systems have been made with reconstructed voxel dimensions of 100 μm or less on the longest side, but only in configurations for imaging small animals such as mice, rats, or rabbits.

The valuable properties of the distributions of attenuation HU values of voxels in specified regions of interests in mammals have not been used in cancer detection, diagnosis, staging, treatment planning, delivery, and monitoring. Further developments are needed to acquire data that can be reconstructed into small voxels approximately in cubic shapes with a system that can be used for human patients.

SUMMARY

A method of analyzing a volumetric data set obtained by an imaging system from an object is provided. The data set is comprised of voxels each having a radiation attenuation coefficient. The method comprises the steps of defining a first region of interest comprising a population of voxels of a first tissue part of the object to obtain a first distribution of radiation attenuation coefficients, defining a second region of interest comprising a sample of voxels of a second tissue part of the object to obtain a second distribution of radiation attenuation coefficients, and distinguishing the second tissue part from the first tissue part using the properties of the first and second distributions of radiation attenuation coefficients.

In one embodiment, the first region of interest comprises a population of voxels consisting essentially of a known tissue part having a first distribution of radiation attenuation coefficients with a known parameter, the second region of interest comprises a sample of voxels consisting essentially of a tissue part suspect of being a cancer having a second distribution of radiation distribution coefficients with a sample mean, and the second tissue part is distinguished from the first tissue part using a probability value, that the second sample mean could have occurred from the first distribution of the known tissue part, just by chance.

In one embodiment, the probability value comprises calculating the mean t* value according to the following equation:

$$t^* = (x^* - \mu)(n)^{1/2}/\sigma$$

where μ is the mean value of the first distribution of attenuation coefficients of the voxel population, σ is the standard deviation of the first distribution of attenuation coefficients of the voxel population, x* is the mean value of the second distribution of attenuation coefficients of the voxel sample, and n is the number of voxels in the second part region of interest.

In some embodiments, the first tissue part or region of interest and/or the second tissue part or region of interest, are defined by segmentation. In a preferred embodiment, the first region of interest and/or the second region of interest are defined by auto-segmentation.

In one specific embodiment, a method of analyzing a volumetric data set obtained by an X-ray imaging system from a human breast is provided. The data set is comprised of voxels each having an X-ray attenuation coefficient value. The method comprises the steps of defining a first region of interest of a population of voxels consisting essentially of a known tissue of the breast to obtain a first distribution of X-ray attenuation coefficients, defining a second region of interest of a sample of voxels consisting essentially of a tissue suspected of being cancer to obtain a second distribution of X-ray attenuation coefficients, calculating the mean value of the second distribution of the sample of voxels, and determining a probability value that said sample mean of the second distribution, could have occurred from the first distribution of the known tissue, just by chance.

BRIEF DESCRIPTION OF THE DRAWINGS

These and various other features and advantages of the present invention will become better understood upon reading of the following detailed description in conjunction with the accompanying drawings and the appended claims provided below, where:

FIG. 8A is a 2D image of a patient's breast showing hand rendered segmentation of a healthy glandular region of interest before contrast agent is injected;

FIG. 8B is a plot of distribution of X-ray attenuation coefficients of voxels of the hand rendered glandular region before contrast is injected;

FIG. 9A is a magnified image of a patient's breast showing hand rendered segmentation of a suspect region of interest before contrast is injected;

FIG. 9B is a plot of distribution of X-ray attenuation coefficients of voxels of the hand rendered suspect region shown in FIG. 9A before contrast is injected;

FIG. 15 is slice image showing smoothing of autosegmentation perimeter of a suspect region of interest;

FIGS. 16A-16B depict parameters of smoothing in accordance with one embodiment of the invention;

FIGS. 17A-17F are slice images illustrating high contrast presentation in accordance with one embodiment of the invention.

DETAILED DESCRIPTION OF VARIOUS EMBODIMENTS

Figure 1:
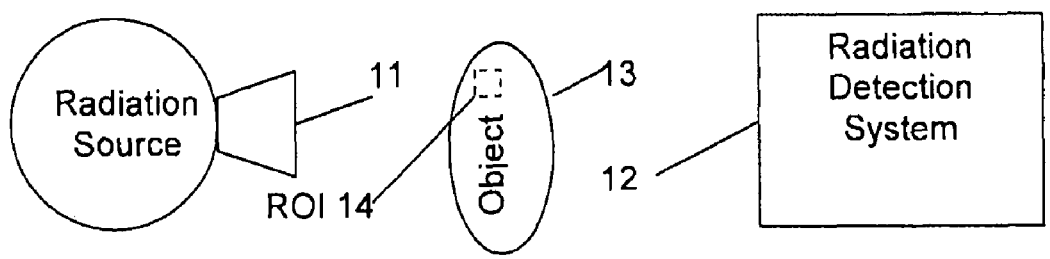
FIG. 1 is a schematic diagram illustrating an X-ray imaging system in accordance with one embodiment of the present invention.

Various embodiments of the present invention are described hereinafter with reference to the figures. It should be noted that the figures are not drawn to scale and elements of similar structures or functions are represented by like reference numerals throughout the figures. It should also be noted that the figures are only intended to facilitate the description of specific embodiments of the invention. They are not intended as an exhaustive description of the invention or as a limitation on the scope of the invention. In addition, an aspect described in conjunction with a particular embodiment of the present invention is not necessarily limited to that embodiment and can be practiced in any other embodiments of the present invention. For instance, various embodiments of the invention are described with an X-ray photon imaging system. It will be appreciated that the claimed invention can also be used for any other type of imaging systems such as infrared ray, visible ray, and ultraviolet ray photon imaging systems and for electron ray, neutron ray, proton ray, alpha particle ray and other energetic particle imaging systems. Further, various embodiments of the invention are described with human breasts for illustration purpose. It will be appreciated that the claimed invention can also be used for any object of interest.

FIG. 1 schematically illustrates an imaging system in accordance with one embodiment of the invention. The imaging system 10 includes a radiation source 11 and a detector 12. Between the spaced apart radiation source 11 and detector 12 is an object 13 to be investigated. By way of example, the object 13 can be any object such as a mammal, or a portion of a mammal such as a patient's breast.

The radiation source 11 transmits a radiation beam to a region of interest 14 in the object 13. The radiation beam may consist of photons, electrons, protons, neutrons, alpha particles, other charged particles, etc. In one embodiment, the radiation source 11 is an X-ray source that transmits an X-ray beam to a region of interest 14 in the object 13.

The detector 12 receives and detects the radiation beam passing through the region of interest 14. By way of example, the detector 12 may be a two-dimensional flat panel X-ray imager. A volumetric data set may be acquired by providing relative motions among the radiation source 11, the detector 12, and the object 13 being studied.

Contrast agents can be administered to the patient to enhance geometrical structural and/or functional contrast in the images. The contrast agent can be any substance that alters the contrast of images by affecting the attenuation of X-rays, including the functional alteration of contrast leakage produced by the angiogenic capillaries present in most solid cancer lesions larger than about 0.5 mm in diameter. The contrast agent can be a positive contrast medium that absorbs X-rays more strongly than the tissue or structure being examined, or a negative contrast medium that absorbs X-ray less strongly. By way of example, the contrast agent can be iodine-based or gadolinium-based. Examples of iodine-based contrast agents include but are not limited to Visopaque (iodixanal, GE Healthcare), omnipaque (iohexol, GE Healthcare), Ultravist (iopromide, Berlex), or isovue (iopamidol, Bracco Diagnostics). Examples of gadolinium-based contrast agents include but are not limited to MultiHance (gadobenate dimeglumine, Bracco Diagnostics), Omniscan (GE Healthcare), or Magnevist (Berlex Laboratories). Preferably, the contrast agent used in the present invention include any iodine based contrast agent with high concentration, such as 300 milligrams of iodine per ml or above. In a specific example, the contrast agent used in the present invention is Visopaque.

The effective amount of the contrast agent depends on the location in the patient's body region being imaged, the location of the contrast injection site relative to the heart, the size and weight of the patient, the physical condition of the patient (e.g. cardiac output, arteriosclerosis, diabetes, kidney, obesity, liver or other organ damage or failure, muscles relaxed or tensed, etc.), and the patients position (e.g. standing, sitting, lying down, face first or on back). In general, the effective amount of the contrast agent is in the range from 50 to 150 ml and can be determined by clinical study.

The imaging system 10 may be configured to provide reconstructed voxels of approximately symmetric shapes with a ratio of the largest to the smallest voxel dimensions less than 5 and preferably less than 2, and at the same time providing small maximal voxel dimensions of 0.3 mm on a side or less for high spatial resolution. The system may be configured to accommodate objects 13 as large as a human patient or as large as a portion of a human patient. The magnification, the detector pixel sizes, and radiation source focal spot sizes may be selected to provide data that can be reconstructed into near symmetric cubic voxels. U.S. patent application Ser. No. 11/437,076 filed May 18, 2006 describes a method and system for cone beam X-ray imaging, the disclosure of which is incorporated herein by reference in its entirety.

By way of example, in an exemplary imaging system, the radiation source 11 includes an X-ray tube operated at 80 kVp, and the detector 12 is a flat panel digital X-ray imager. The X-ray source may have a rating higher than 1000 mA. The detector does not require voxel binning (e.g. 2×2) since the data are no longer photon starved and noisy for higher mA values. Without this binning, the pixel, and the reconstructed voxel linear dimension sizes may be reduced to approximately 0.15 mm on their longest side. The X-ray source and detector may be mounted on a rotating C-arm and enclosed in a structure so that the object 13 such as a breast of a patient in a prone position is exposed to a cone X-ray beam. The relative movement among the X-ray source 11, detector 12, and the patient's breast 13 provide a 3D volumetric data set of the HU values of voxels in the object 13. The resulting voxel dimensions are approximately symmetric with voxel dimensions less than 0.3 mm and the smallest voxel dimension larger than 0.2 mm.

In one aspect, the present invention provides a method of analyzing a volumetric data set obtained by an imaging system from an object. The data set is comprised of voxels each having a radiation attenuation coefficient value. As used herein, radiation attenuation coefficient value refers to the a parameter describing the diminution of average ray intensity with respect to distance along a transmission path. For X-ray photons, this coefficient value describes the exponential diminution of intensity with distance along the transmission path. In computed tomography, the attenuation coefficients are typically calibrated using the average X-ray attenuation of water as the zero reference and of empty space as minus 1000, and expressed in Hounsfield units (HU).

According to the present method, a first region of interest comprising a population of voxels of a first tissue part of the object is defined to obtain a first distribution of radiation attenuation coefficient values. A second region of interest comprising a sample of voxels of a second tissue part of the object is defined to obtain a second distribution of radiation attenuation coefficient values. The second tissue part is distinguished from the first tissue part using the distribution properties of the first and second distributions of radiation attenuation coefficients. In statistics, the term population and sample have standard meanings that are known to one of ordinary skill. For example, as used herein, a population refers to a collection of a large group of voxels from which a characteristic of the population, or parameter, is drawn. A sample refers to a subgroup of voxels selected from a population. Distribution properties include the distribution probability, population parameter, sample means, etc., the meaning of which are well known in the art.

Figure 2A:
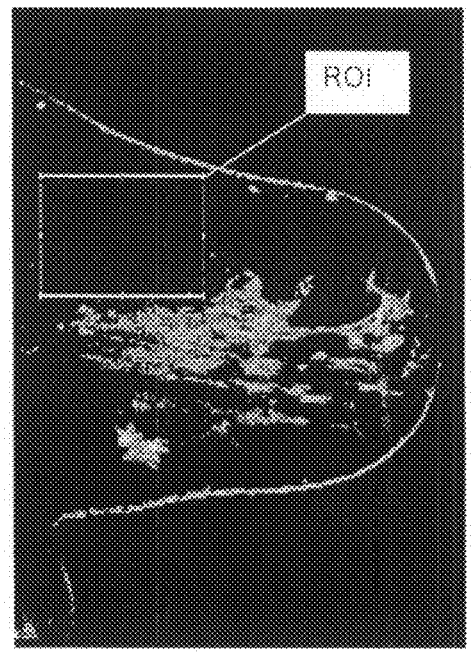
FIG. 2A is a 2D image of a patient's breast with a rectangular box defining an adipose region of interest after a contrast agent was injected into the patient.
Figure 2B:
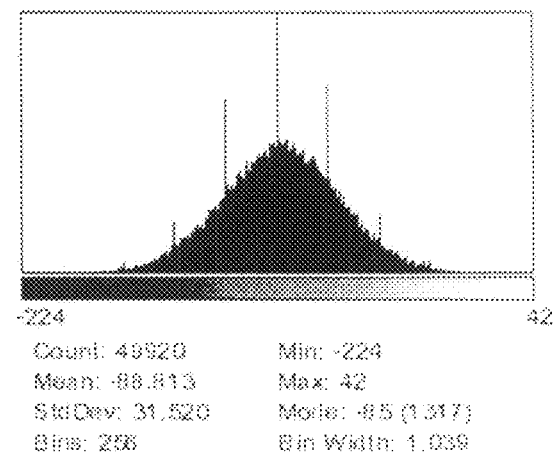
FIG. 2B is a plot of the distribution of X-ray attenuation coefficients of voxels of the adipose region of interest defined in FIG. 2A after a contrast agent is injected into the patient.

FIG. 2A is a 2D slice image of a patient's breast from a 3D data set acquired by the imaging system 10 in accordance with one embodiment of the invention after contrast injection. A region of interest consisting of or consisting essentially of breast adipose tissue is defined by a box as shown in FIG. 2A. The distribution of X-ray attenuation coefficients of voxels as indicated by HU values in the adipose region of interest is shown in FIG. 2B (Data Set 1600).

Figure 3A:
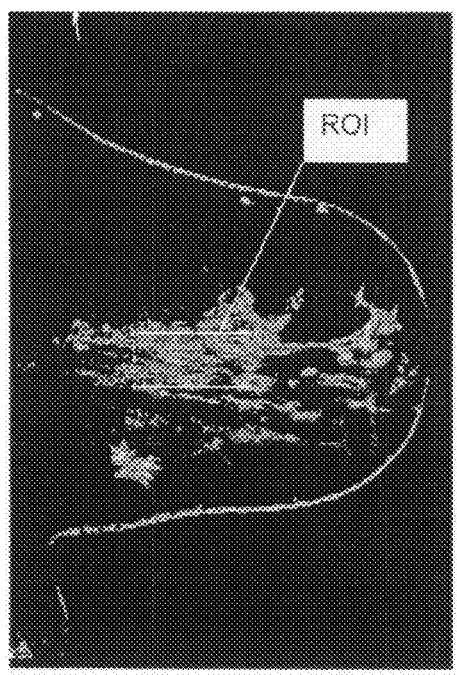
FIG. 3A is a 2D image of a patient's breast with a rectangular box defining a glandular region of interest after a contrast agent was injected into the patient.
Figure 3B:
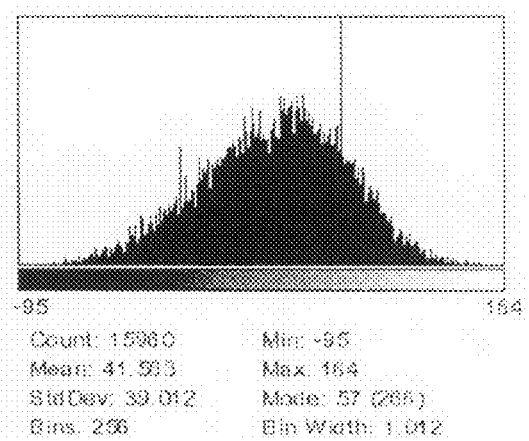
FIG. 3B is a plot of distribution of X-ray attenuation coefficients of voxels of the glandular region of interest defined in FIG. 3A after a contrast agent is injected into the patient.

FIG. 3A is a 2D slice image of a patient's breast with a box defining a glandular region of interest after contrast injection. The distribution of X-ray attenuation coefficients of voxels in the glandular region of interest is shown in FIG. 3B.

Figure 4A:
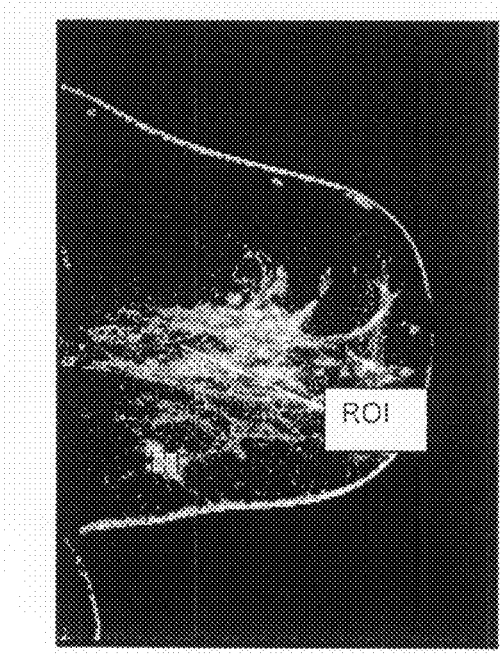
FIG. 4A is a 2D image of a patient's breast with a rectangular box defining an invasive ductal carcinoma (IDC) region of interest after a contrast agent is injected into the patient.
Figure 4B:
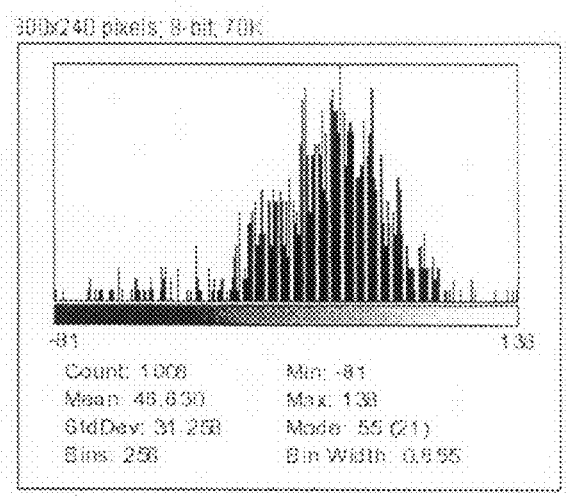
FIG. 4B is a plot of distribution of X-ray attenuation coefficients of voxels of the IDC region of interest defined in FIG. 4A after a contrast agent is injected into the patient.

FIG. 4A is a 2D slice image of a patient's breast with a box defining an invasive-ductal-carcinoma (IDC) region of interest. The distribution of X-ray attenuation coefficients of voxels in the IDC region of interest is shown in FIG. 4B.

Figure 2C:
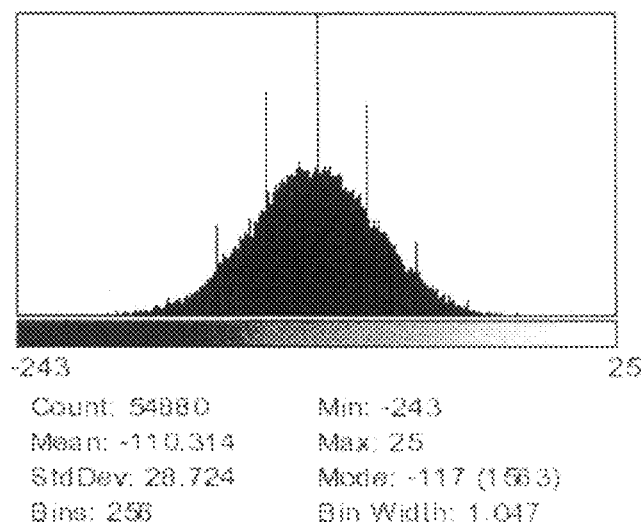
FIG. 2C is a plot of the distribution of X-ray attenuation coefficients of voxels of the adipose region of interest defined in FIG. 2A before a contrast agent is injected into the patient.
Figure 3C:
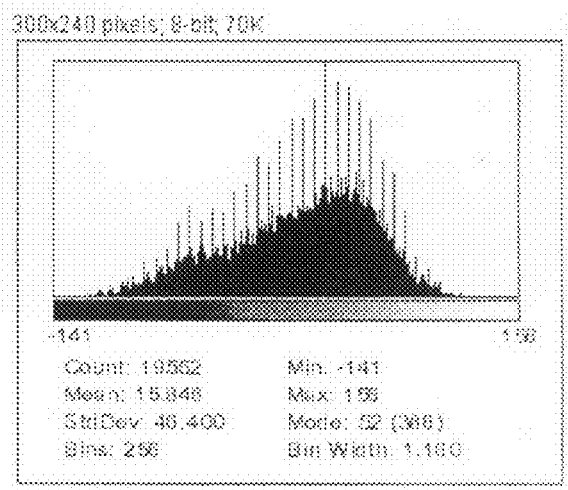
FIG. 3C is a plot of distribution of X-ray attenuation coefficients of voxels of the glandular region of interest defined in FIG. 3A before a contrast agent is injected into the patient.
Figure 4C:
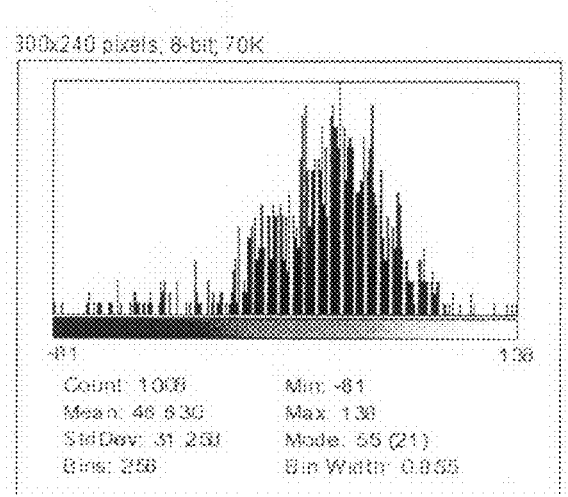
FIG. 4C is a plot of distribution of X-ray attenuation coefficients of voxels of the IDC region of interest defined in FIG. 4A before a contrast agent is injected into the patient.

The data sets for FIGS. 2A-2B, 3A-3B, and 4A-4B were acquired about 140 seconds after an iodine contrast agent in 320 mg/ml was injected into the arm vein of a patient in the amount of 100 cc at 4 cc/second, by way of example. FIGS. 2C, 3C, and 4C show distributions of X-ray attenuation coefficients of voxels of adipose, glandular, and IDC regions-of-interest respectively, from data sets acquired prior to administration of the contrast agent to the patient.

Figure 5:
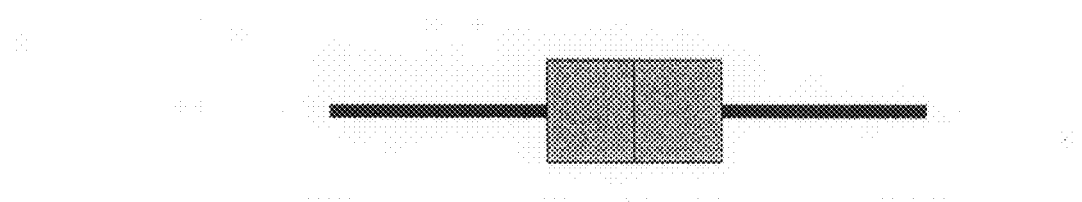
FIG. 5 is a box plot showing a summary of five statistical distribution parameters.

A standard way of summarizing the gross properties of distributions is box plots with a five parameter summary as shown in FIG. 5. The solid line spans the whole range of HU values from the minimum to the maximum. $Q_1$ is the HU value where 25% of the counts lie below it (first quartile) while $Q_2$ and $Q_3$ are the $3^{rd}$ and $4^{th}$ quartile values with 50% and 75% of the total number of counts lying below them respectively. $Q_2$ is also referred to as the median.

Figure 6:
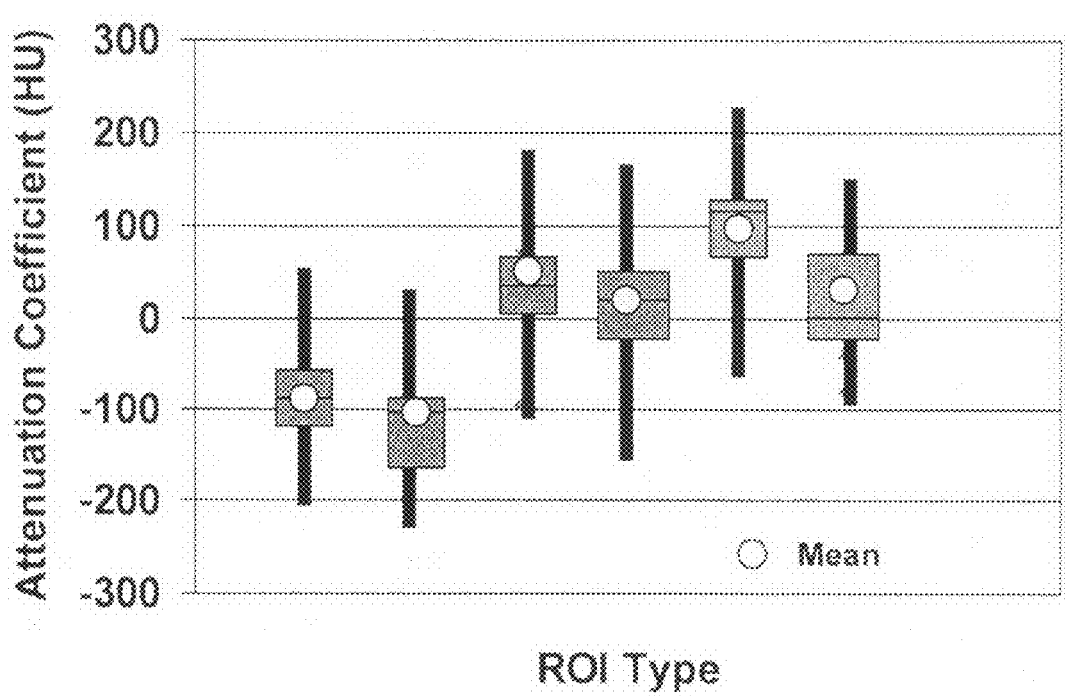
FIG. 6 is a box plot showing the five distribution parameters of X-ray attenuation coefficient values, plus the mean, of adipose, glandular, and IDC regions of interest, both with and without contrast injection.

FIG. 6 is a plot of the five parameters (minimum, maximum, $Q_1$, $Q_2$, and $Q_3$) and the means for three regions of interest (adipose, glandular, and IDC) with and without introduction of an iodine contrast agent. The HU values for the six parameters are summarized in Table 1, which also includes the mean μ and standard deviation σ values (in HU units) plus total number of counts (i.e. the total number of voxels) in each region of interest.

TABLE 1

| ROI | CONTRAST | Q1 | Q2 | Q3 | Mean | σ | Min | Max | No. Voxels |
|---|---|---|---|---|---|---|---|---|---|
| Adipose | w/o | −168.6 | −111.1 | −91.2 | −110.3 | 28.72 | −243 | 25 | 54,880 |
|  | With | −110.7 | −90.0 | −69.2 | −88.8 | 31.52 | −224 | 42 | 49,920 |
| Glandular | w/o | −16.3 | 22.6 | 50.4 | 15.85 | 46.40 | −141 | 156 | 19,552 |
|  | With | 14.28 | 43.6 | 68.9 | 41.56 | 39.01 | −95 | 164 | 15,960 |
| IDC | w/o | −37.4 | −14.3 | 67 | 46.63 | 31.30 | −81 | 138 | 1008 |
|  | With | 79.0 | 105.0 | 131.4 | 103.5 | 40.40 | −54 | 212 | 1204 |

In statistics, a density curve for distribution is used to describe an overall pattern of a distribution. A density curve is always on or above the horizontal axis and has an area of exactly 1 underneath. The area under the curve and above any range of values on the horizontal axis is equal to the proportion of observations falling in this range, as a fraction of the whole.

The density curve for a normal distribution is symmetric, single-peaked and bell-shaped. All normal distributions have the same overall shape. The exact density curve for a particular normal distribution $N(\mu, \sigma)$ is specified by its mean μ and standard deviation σ. The mean μ is the center of the curve and σ is the distance to the inflection points on either side of the curve.

Normal distributions share many common properties. All normal distribution are the same when measurements are made in units of standard deviation σ about the mean μ. These are called standardized observations. The standardized value z of an observation x is:

$$z=(x-\mu)/\sigma \qquad (1)$$

If variable x has a normal distribution $N(\mu, \sigma)$ with mean μ and standard deviation σ, then the standardized variable $z=(x-\mu)/\sigma$ has the standard normal distribution $N(0,1)$ with mean 0 and standard deviation 1. Look-up tables have been created in the art that give the proportions of standard normal observations for many values of z. For example, Table A provided by D. Yates et al., *The Practice of Statistics*, W. H. Freeman, New York, 1999 ("Yates et al.") is one such look-up table. Therefore, by standardizing, one can use a look-up table for any normal distribution.

A significance test assesses the evidence provided by data against a null hypothesis $H_0$ in favor of an alternative hypothesis $H_a$. The p-value is the probability, computed supposing $H_0$ to be true, that the test statistics will take a value at least as extreme as that actually observed. Small p-values indicate strong evidence against $H_0$. Calculating p-values requires knowledge of the sampling distribution of the test statistics when $H_0$ is true.

Z-test is a significance test for hypotheses $H_0$:

$$z=(x-\mu)n^{1/2}/\sigma \qquad (2)$$

The Z-test assumes a simple random sample of size n, known population standard deviation σ, and either a normal population or a large sample. In practice, when the mean of a population is unknown, the standard error $\sigma/n^{1/2}$ of a sample of size n is used to get a one-sample t statistic:

$$t=(x-\mu)n^{1/2}/\sigma \qquad (3)$$

The t statistic has the t-distribution. The number t is also called the upper p critical value of the standard normal distribution. Critical values for many confidence levels have been created in the art and available as a look-up table. Table C provided by Yates et al. is an example of such look-up table.

To determine the sample size n that will yield a confidence interval for a population mean μ with a specified margin of error m, set the expression for the margin of error to be less than or equal to m and solve for n:

$$z\sigma/n^{1/2}<m \qquad (4)$$

Figure 7:
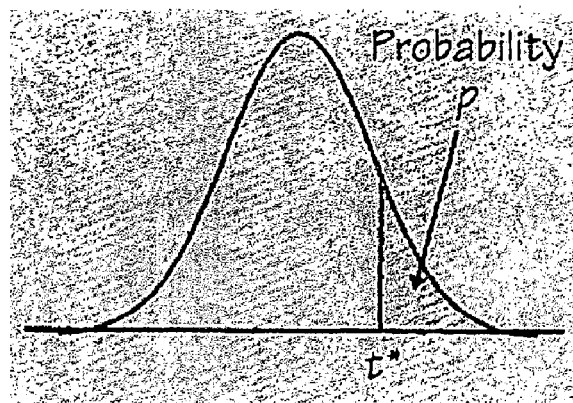
FIG. 7 is a plot showing t-distribution.

FIG. 7 is a plot illustrating the t-distribution available from Yates et al. The shaded fraction under this area accumulating to the t* value gives the probability p with confidence C that this t* value does not occur from this distribution, so that the remaining area gives the probability that a value could have come from this distribution.

Accordingly, if a large population such as a glandular or adipose population with a large number elements is known with mean μ and standard deviation σ and has a normal distribution, then the probability p that a much smaller sample with n elements from the same glandular or adipose population could have an observed IDC mean values x* just by chance can be calculated. The t* value for this situation is:

$$t^*=(x^*-\mu)(n)^{1/2}/\sigma \qquad (5)$$

In an exemplary embodiment, a large glandular population with a large number elements (15,960 with contrast and 19,552 without contrast) has a known mean μ (41.6 HU with contrast and 15.8 HU without contrast) and a known standard deviation σ (39.0 HU with contrast and 46.4 HU without contrast). A much smaller suspected IDC sample with n elements (1204 with contrast and 1008 without contrast) has an observed mean value x* (104 HU units with contrast and 46.6 HU without contrast). The probability that the observed mean value x* could have been from the large glandular population just by chance can be calculated according to the above equation (5).

Table 2 lists the t*, probability p, and confidence C values that the IDC region HU distribution came by chance from the healthy glandular distribution (Data Sets 1599 & 1600).

TABLE 2

| IDC Condition | t* | p | C |
|---|---|---|---|
| With Contrast | 67.0 | <10⁻²⁹³ | 1 |
| Without Contrast | 21.0 | 9(10⁻⁸²) | 1 |

The values of probabilities p indicate that these two IDC distributions have essentially no probability of having occurred by chance from the glandular distribution. This information is valuable since image screening typically does not include contrast injection. Hence identifications with high confidence can be made when visual human observations are not very clear. Even with iodine contrast, a numerical value (p) can be determined to indicate how confident one can be with a given identification.

Typical threshold probability p values for determining statistical significance are 0.05, 0.01, and 0.001, which correspond to chance occurrences of one-in-20, one-in-100, and one-in-1000 respectively. Clearly, the data in Table 2 are well beyond the typical threshold p values.

The minimum number of voxels required in a suspect IDC region of interest with probabilities p=0.05, 0.01, or 0.001 that the sample mean is accurate to $\sigma$ and does not occur by chance from the healthy glandular distribution can be calculated according to equation (4). Table 3 provides an example for the minimum number with different probability values with or without contrast injection to the patient (first patient, Data Sets 1599 & 1600):

TABLE 3

| | Minimum n | | |
|---|---|---|---|
| p | 0.05 | 0.01 | 0.001 |
| With or Without Contrast | 271 | 543 | 949 |

The minimum voxel numbers respectively correspond to cubic regions of interest measuring 7, 9, and 10 voxels on a side respectively. With voxels measuring approximately 0.3 mm on a side, these correspond to cubic volumes measuring 2.1 mm, 2.7 mm, and 3 mm linear dimensions per side respectively. This means that one can have a 99.9 percent confidence level in measuring means of regions of interest with no more than 0.1 $\sigma$ errors in regions of diameters on the order of 3 mm and a 95 percent confidence level for region of interests whose diameters exceed about 2 mm.

Thus, according to one embodiment of the invention, a cube of 7×7×7 to 10×10×10 voxels is sequentially moved over a three dimensional voxel matrix of HU data set. The mean and p value are calculated at each region relative to a large glandular or a large adipose region of interest (previously selected from a view such as from FIGS. 2 and 3) used as large population standards. By way of example, a large glandular or adipose region of interest may include more than 10,000 voxels. For regions with p values of 0.05 or less, biopsy may be performed to determine if a malignant cancer is present. In some embodiments, voxel matrix data sets may be preprocessed to remove the voxels of the skin, which may give large HU values that otherwise can be confused with cancer lesions.

The probability, of whether a normal distribution of mean value $\mu$ and standard deviation $\sigma$, can give a certain x* value, where x* is the mean of some other separate population, can be determined by $$z^* = (x^* - \mu)/\sigma \quad (6)$$

using the FIG. 7-*type* plot of a normal distribution, and the probability specified by the area under the normal distribution curves above this z* value, specified in look up tables in standard statistics texts (e.g. Yates et al.). This z* probability criterion has usefulness in comparing the relative probability rank of two different suspect tissue parts, containing differing numbers of voxels n.

It is known that the attenuation coefficients in malignant cancerous tissues such as invasive ductal carcinomas are different from those in the healthy tissues. The closely packed cancer cells invade the glandular tissues and convert the organized and functional structures into disarrayed regions. Thus, the density $\rho$ in these densely packed cancer cells is higher. The density $\rho$ is a strong variable controlling the magnitude of X-ray attenuation coefficients. IDC is the most common type of invasive breast cancer, accounting for about 47 to 75 percent in published breast cancer, and is therefore an important fraction of all breast cancers encountered. A complete cone beam CT reconstructed data set can measure for example 512×512×300 in size, comprising more than 78 million voxels where each has its own HU value. Hence the patient's breast anatomy was queried at a large population of individual voxels sites. Further, the patient was used as its own norm by selecting adipose or glandular tissue sites believed to be free of cancer. Even if some of these reference sites contained malignant regions, as long as they were a small fraction of the total reference volume, their values would have had minimal relative effect due to the large number of voxels (such as more than 10,000 voxels) of the reference region of interest.

In a preferred embodiment, a 3D volumetric data set of X-ray attenuation coefficient values is obtained. The data set may be acquired, for example, by a cone beam CT system. Preferably each voxel in the matrix is approximately cubic shape. From the 3D data matrix or 2D planar slice images from the matrix, regions of interest are defined in any continuously connected voxels form. For example, the region of interest may be defined in 2D rectangular boxes, or in any arbitrarily curved or bounded surfaces, or in arbitrarily shaped volume forms, or symmetrically shaped cubes. In the defined region of interest, a distribution of a large number of voxels such as more than 10,000 voxels of attenuation coefficient values are obtained where there is reason to believe that the region of interest consists essentially of healthy adipose tissues, or essentially of healthy glandular tissues. From the reference adipose or glandular tissues, a mean is calculated along with the standard deviation. These can be performed in three different situations: 1) without contrast injection; 2) with contrast injection; and 3) before and after contrast injection.

A cubic shaped volume with dimensions from 2 to 10 voxels on each side of the cube is defined and sequentially shifted by one cubic side dimension at a time so the 3D matrix is interrogated over its whole volume or over a portion of the volume that contains the region of interest. At each such interrogation position, the mean is calculated for the distribution of voxel attenuation coefficients such as shown in FIGS. 4 and 9, and the p values are calculated to determine how probable it is that that particular sample distribution is just a chance result from the reference healthy adipose or glandular distributions. Using small probability p values such as those listed in Table 2 or Table 3, one then decides whether to further study all such positions to determine if cancer is present in such small p identified locations. If the interrogation is done for data sets with no contrast enhancement, the follow-up can be a repeat study with contrast enhancement for more definitive answers, as illustrated in the small probability values and higher confidences levels of Table 2 for the case of contrast enhancement. When contrast has been used, the next follow-up can be biopsy of the region for histological determination of the presence or absence of cancer. If confidence is sufficiently high, one can go from the non-contrast study directly to biopsy and histology.

In some embodiments, segmentation technique may be used to obtain more precise distributions of attenuation coefficients in ROIs that better characterize the healthy adipose or glandular regions as well as the sample regions suspected of being cancer. As shown in FIG. 8A, a hand rendered border for the healthy glandular is defined to exclude regions of apparent adipose tissue. Similar rendering and segmentation of the suspect region is shown in FIG. 9A under magnification to facilitate the segmentation. The t* value for the probability that the distribution in FIG. 9A could by chance be produced from the large healthy reference distribution shown in FIG. 8A is $t^*=26.7$ with a corresponding p value of $1.8(10^{-107})$ and a confidence level C of essentially 1. Compared with the embodiment where a rectangular box is used to define a region of interest as shown in FIG. 2A, segmentation technique confirms with even higher confidence that the distribution shown in FIG. 9A could not have occurred by chance from a healthy reference distribution shown in FIG. 8A.

Figure 10A:
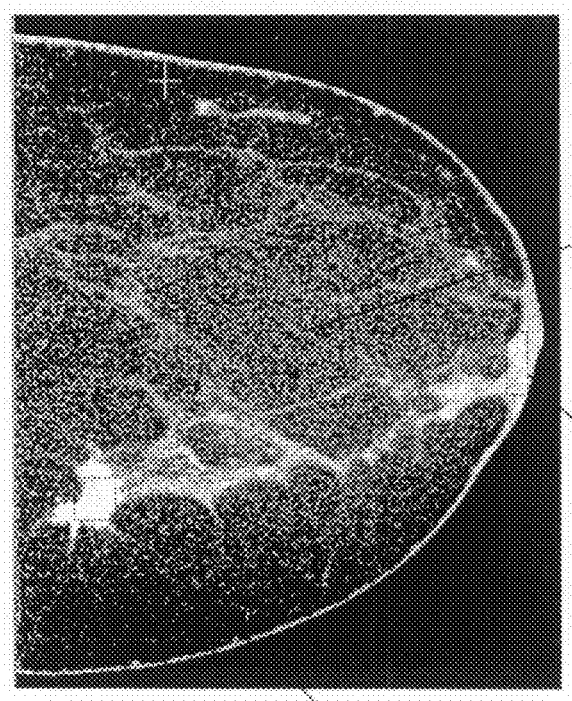
FIG. 10A is a 2D image of another patient's breast showing defined regions of interest of glandular, adipose, and suspect IDC tissues with contrast enhancement.
Figure 10B:
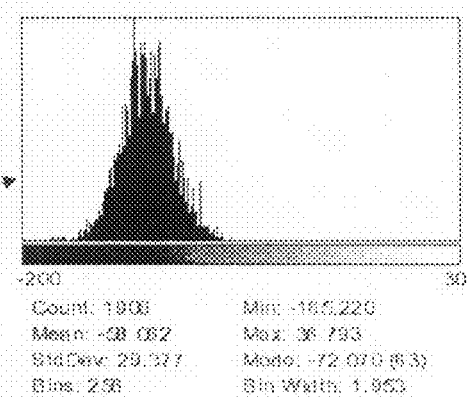
FIG. 10B is a plot of distribution of X-ray attenuation coefficients of voxels of the adipose region as defined by the indicated box in FIG. 10A, after contrast injection.
Figure 10C:
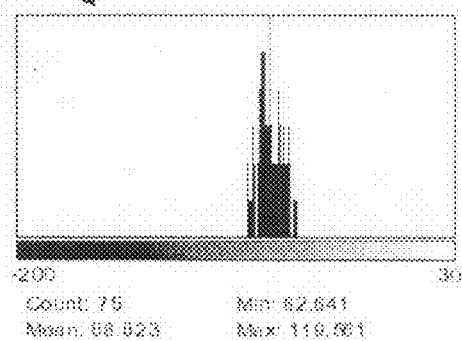
FIG. 10C is a plot of distribution of X-ray attenuation coefficients of voxels of the glandular region as defined by the indicated retangle in FIG. 10A, after contrast injection.
Figure 10D:
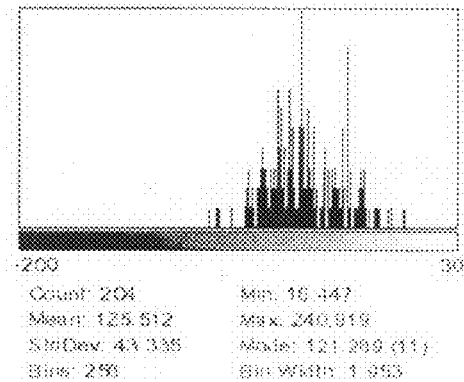
FIG. 10D is a plot of distribution of X-ray attenuation coefficients of voxels of the suspect IDC region as defined by the indicated box in FIG. 10A, after contrast injection.

In some embodiment, auto segmentation is used to obtain distributions of attenuation coefficients in regions of interest. FIG. 10A is a reconstructed sagittal image on a patient (Data Set 749) after injection of an iodine contrast agent. The corresponding HU distributions of defined adipose and glandular voxels are shown in FIGS. 10B and 10C, while the HU distribution of identified IDC voxels is shown in FIG. 10D. For auto segmentation, a choice was made to surface render regions in color such as red where the HU values fall in a predetermined range. For example, a range of HU values between 130 and 235 may be surface rendered. As shown in FIGS. 10C and 10D, the maximum HU value for the healthy glandular tissue is 119.6 and maximum HU value for the suspect IDC tissue is 240.9. Thus, a range between 130 and 235 excludes the regions of healthy glandular tissue but includes most of the suspect IDC tissues. The 130 HU value has a normalized distribution z* value of 2.94 with a corresponding p value of 0.0016. If one estimates that the total glandular population for this patient is 50,000, then multiplying this number by 0.016 gives an estimate of 50 voxels that would lie above 130 HU, in a distribution with the indicated glandular mean of 88.8 HU and a standard deviation of 14.0 HU.

Figure 11:
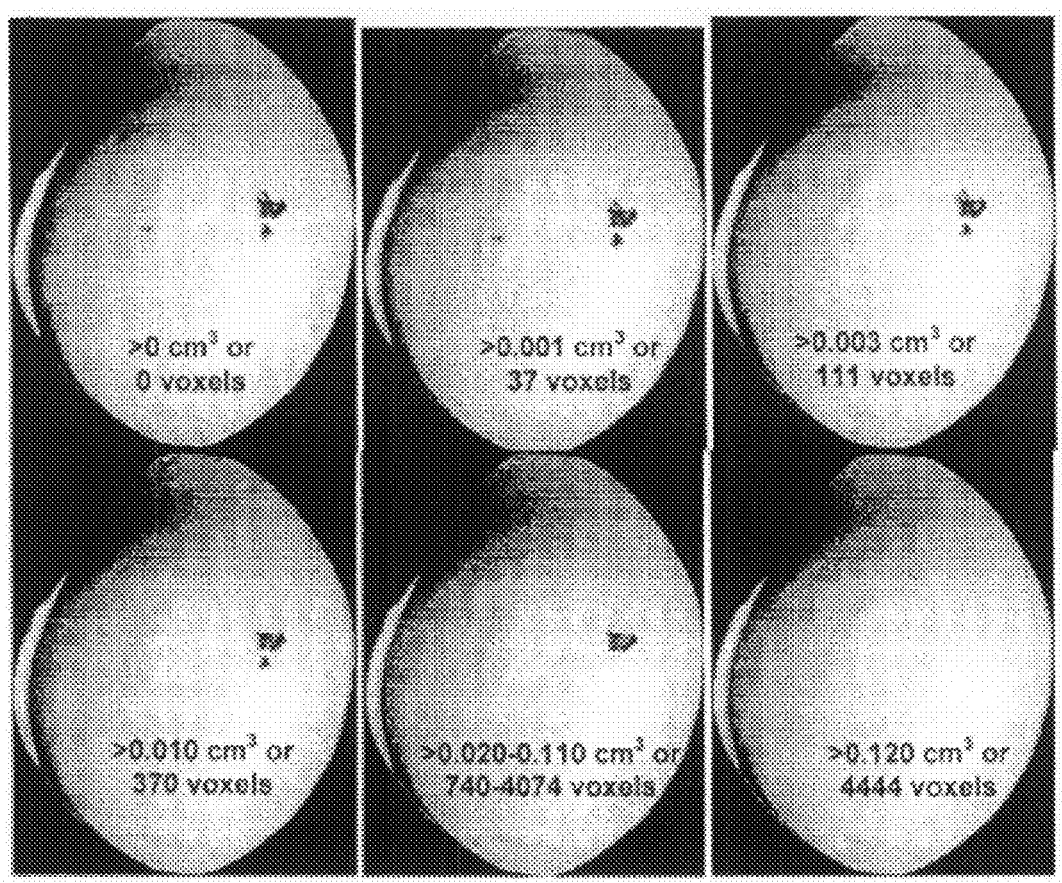
FIG. 11 shows the results of auto segmentation of a volumetric data set from the first patient's breast, after contrast is injected.

FIG. 11 shows the results of auto segmentation of a patient's whole 3D volumetric, cone beam CT data set (749) to surface render regions with HU values between 130 and 235 HU. A criteria is applied to display surface rendered volumes that successively exceed value from $>0.001$ to $>0.110 \text{ cm}^3$. At a value $>0.120 \text{ cm}^3$, no volumes are shown. From the voxel dimensions of approximate 0.3 mm on a side, the approximate minimum number of voxels required for display range from 37 through 4444, as also marked on each image. The images were magnified 200% to allow accurate counting of the number of rendered objects. There are 12 to 0 rendered objects as shown at the top center of each image.

Figure 13:
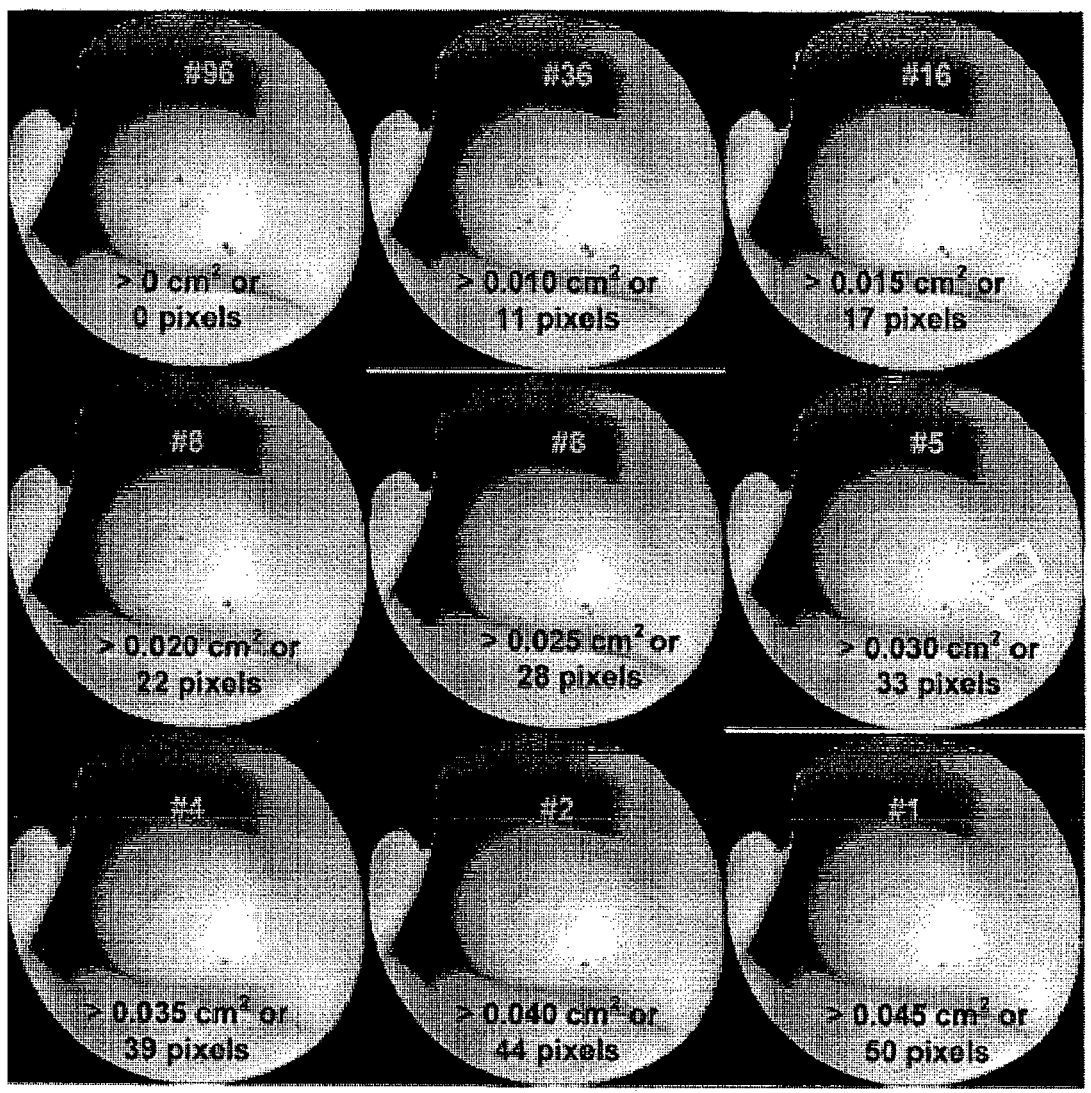
FIG. 13 shows the results of auto segmentation of a volumetric data set from the second patient's breast.

FIG. 13 shows the results of auto segmentation of another patient's 3D volumetric, cone beam CT (data set 1600) to surface render regions with HU values between 160 and 300 HU. Here the rendered volumes are shown whose surface areas exceed the indicated values. Using the approximate 0.3 mm side dimensions of the reconstructed voxels, an equivalent "pixel" area of $9(10^{-4})\text{cm}^2$ has been used to roughly calculate the number of pixels corresponding to each surface area threshold (shown at the bottom of each image in FIG. 13). These images were magnified 500% so that the individual number of separate rendered objects could be accurately counted. The counts ranging from 96 to 1 with $>0.040$ cm² threshold criterion are shown at the center top of each image in FIG. 13. At the threshold criterion of $>0.050 \text{ cm}^2$, the single largest rendered object was still present. This surface-area-threshold embodiment gives a finer discrimination of very small rendered regions and the interval separations between them, due either to the properties of area versus volume thresholds or to physical differences between the patients. As the criterion changed from $>0.020 \text{ cm}^2$ to $>0.025 \text{ cm}^2$, the object count number of 8 stayed the same as the object, at the far left disappeared, but one at the bottom center split into two objects. The region that was biopsy-confirmed to be IDC is occupied by the two separate objects indicated by the block arrow in the center right image of FIG. 13.

Figure 12A:
FIG. 12A is a 2D image of a third patient's breast showing defined regions of interest of biopsy scar, glandular, and adipose tissues after contrast injection.
Figure 12B:
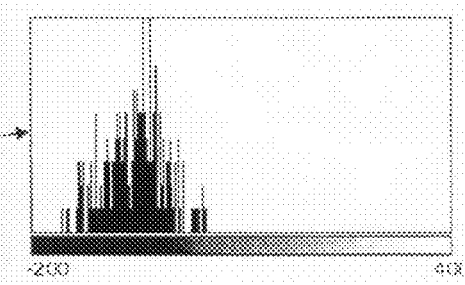
FIG. 12B is a plot of distribution of X-ray attenuation coefficients of voxels of the glandular region as defined by the indicated rectangle in FIG. 12A after contrast injection.
Figure 12C:
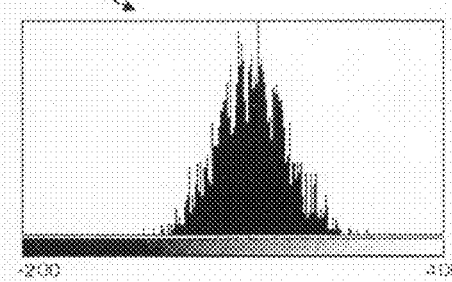
FIG. 12C is a plot of distribution of X-ray attenuation coefficients of voxels of the adipose region as defined by the indicated rectangle in FIG. 12A, after contrast injection.
Figure 12D:
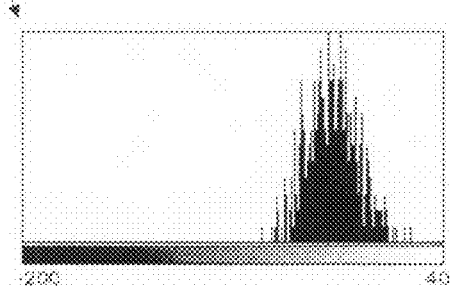
FIG. 12D is a plot of distribution of X-ray attenuation coefficients of voxels of the biopsy scar region as defined by the indicated rectangle in FIG. 12A, after contrast injection.

In one embodiment, a data set from a patient (data set 780) was obtained to investigate a situation where some benign but non-malignant structure is present, which does not correspond to either adipose or glandular breast tissue. This is investigated with data from a third patient, who had been biopsied prior to the acquisition of the cone beam CT data. Wounds heal via angiogenic revascularization of the "damaged" regions. Wound angiogenic capillaries leak contrast agents just as those do from solid cancer lesions. The mean of the resulting biopsy "scar" distribution in FIG. 12A is 241.2 HU units compared to the mean of the glandular region of 127, and the t* value is 46.6.

Table 4 provides a comparison of all the mean and t* values obtained with iodine contrast enhancement. As shown in Table 4, the mean attenuation coefficients vary widely from patient to patient. The third patient is known to be pre-menopausal and younger than the other two. Younger women are known to have denser breasts. From these data, this younger patient not only has a larger fraction of glandular tissue (FIG. 12A), but its radiographic density is also higher. The other two post-menopausal patients (1 and 2) have mean values that differ by more than 40 HU. Hence one can clearly see the value of using each patient as their own reference. The difference between the glandular means of Patient's 1 and 2 is greater than the difference between IDC and glandular for Patient 2. However, the HU difference in Patient 3 between the biopsy scar and the glandular tissue is substantially larger as shown in Table 5. This is much higher than the mean of 127.0 HU units of the healthy glandular tissue, with a standard deviation of 48.6 HU. This corresponds to a "scar" t* value of 95.7, a p-value of $3.0(10^{-273})$, and a C value of essentially 1. For comparison, the IDC t* values of two patients (with iodine contrast) were 67.0 and 26.7 respectively. Hence, one should be able to exclude such "scar" cases by eliminating those cases whose mean t* values exceed a predetermined threshold. The threshold may be established with a clinical study, but a very rough estimate for this threshold value may be approximately a mean value of more than 75 HU. Scars heal via angiogenesis, the same process by which cancer lesions are most clearly enhanced. Apparently there is even more angiogenesis vasculature (and contrast agent leakage) in healing wounds, as in malignant cancer lesions. Another simpler exclusion threshold may be for a region of interest whose mean value exceeds a value such as 170 HU, that again may be established by a clinical study.

TABLE 4

| With Contrast | Mean Attenuation Coefficient (HU) | | | | t* |
|---|---|---|---|---|---|
| | Glandular | IDC | Scar | Difference | |
| Patient 1 (1600) | 41.6 | 104 | — | 62.4 | 67.0 |

TABLE 4-continued

| With | Mean Attenuation Coefficient (HU) | | | | |
|---|---|---|---|---|---|
| Contrast | Glandular | IDC | Scar | Difference | t* |
| Patient 2 (749) | 88.8 | 126 | — | 37.2 | 37.4 |
| Patient 3 (780) | 127 | — | 241 | 114 | 46.6 |

TABLE 5

| Without | Mean Attenuation Coefficient (HU) | | | |
|---|---|---|---|---|
| Contrast | Glandular | IDC | Difference | t* |
| Patient 1 (1599) | 15.6 | 46.6 | 31 | 21.1 |

In some embodiments of auto segmentation, a smooth closed surface is constructed through rendered boundary data points to compare boundary roughness. The mean squared difference between the actual boundary data points and the nearest smoothed surface data point may be calculated. For example, the slices in one direction (e.g., sagittal slice images) that pass through the rendered suspicious object are taken. For a 3 mm long object, for example, the 0.3 mm-on-a-side voxels give 10 slices in the 3 mm length direction. These planes contain the closed curve line of the boundary intersecting that plane. Then one fits a low order polynomial (e.g., 4th or 5th order) that smoothly passes though the "middle" of all boundary points. For each unsmoothed boundary point, four or five adjacent points on the smooth surface may be used to find the minimum distance in the mean squared error and roughness calculation.

To facilitate comparisons between rendered objects of different sizes, a spatial frequency histogram of the difference between the unsmoothed boundary data points and the closest smooth data points may be used. One way to plot such a histogram is against spatial frequency in line pairs per mm (lp/mm) where length is measured along the fit smoothed, curved boundary. Such histograms may have stronger frequency components for rendered cancerous objects than benign and smoother tumors or cysts or surgical or biopsy scars. One way to approximate this is to take the differences between the unsmoothed data sets and put them opposite a measurement of the linear distance along the smoothed line. Fourier transform may be used of fast processing of the data set. When all the other slices passing through the suspect rendered object are repeated and combined, the spatial frequency histogram of this objects boundary is obtained. The resulting spatial frequency histograms may be used for their absolute values and shapes, or in comparisons with other healthy objects that may be identified and used as a healthy reference or norm.

Figure 14:
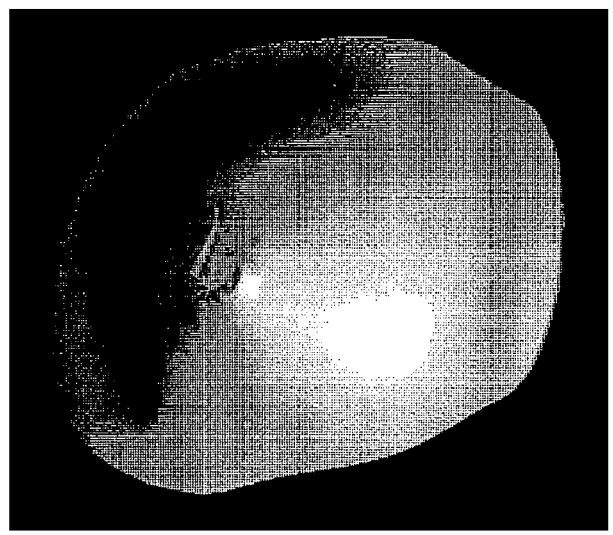
FIG. 14 shows a volume surface rendering of the third patient's cone beam CT data set, after contrast injection.
Figure 18:
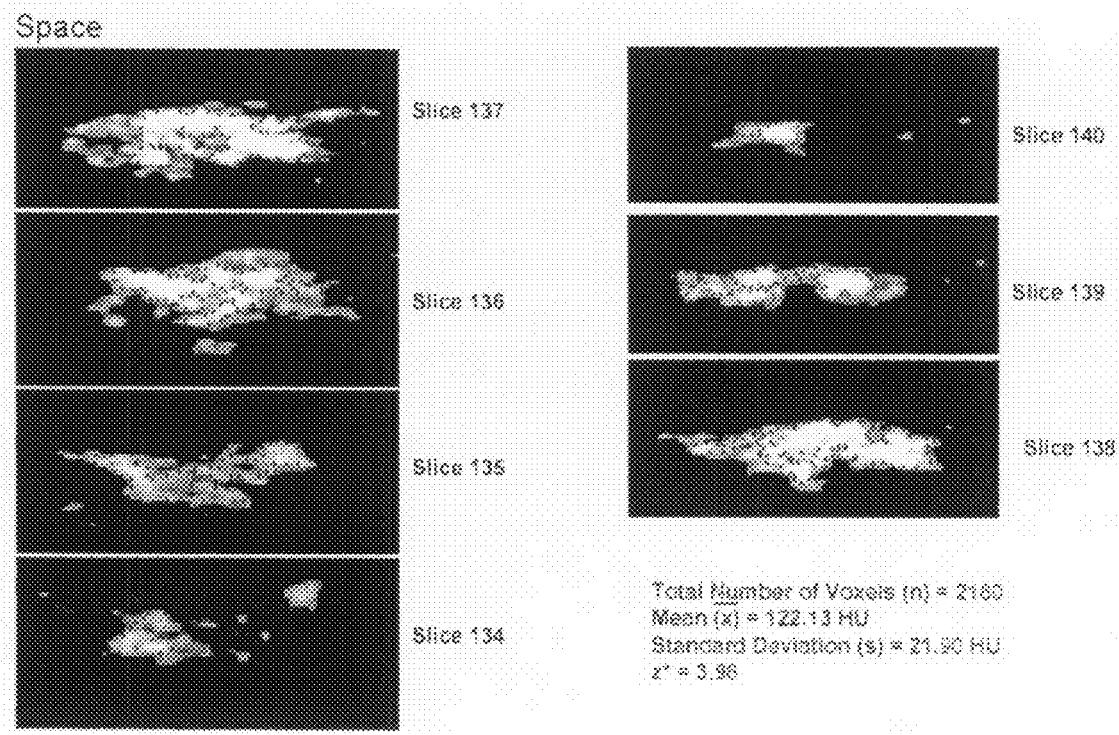
FIGS. 18-22 are slice images showing hand segmentation in accordance with one embodiment of the invention.
Figure 19:
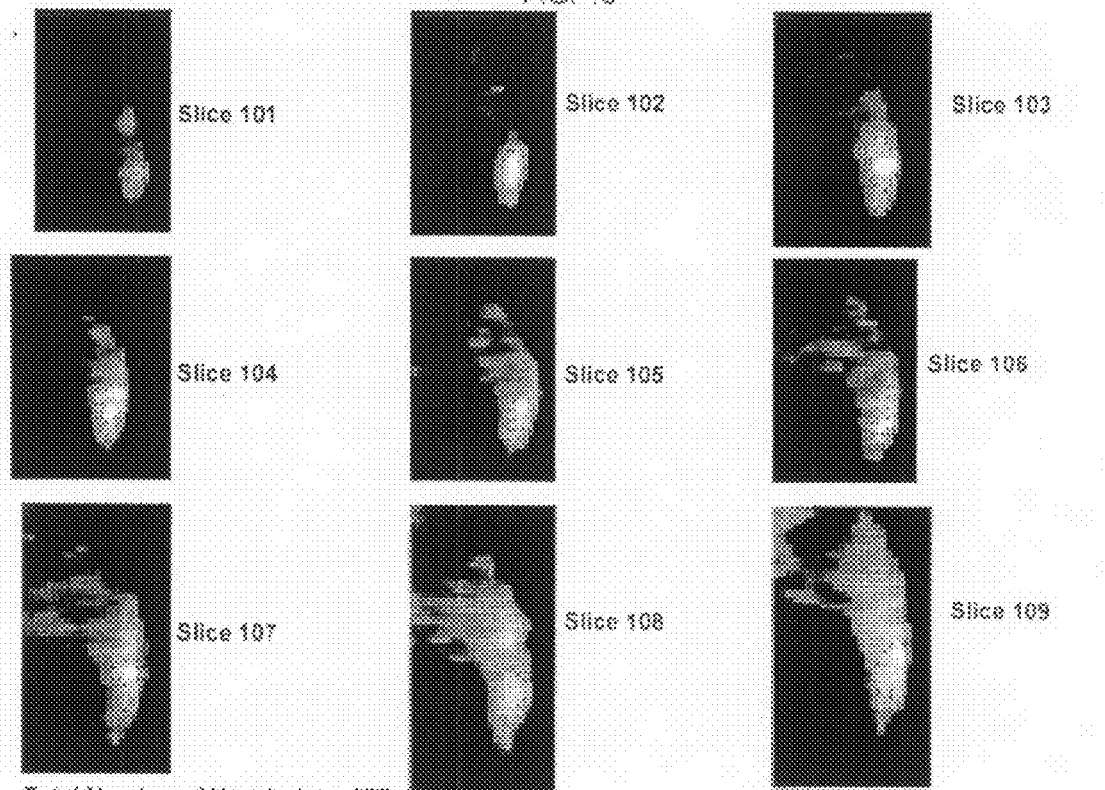
Figure 20:
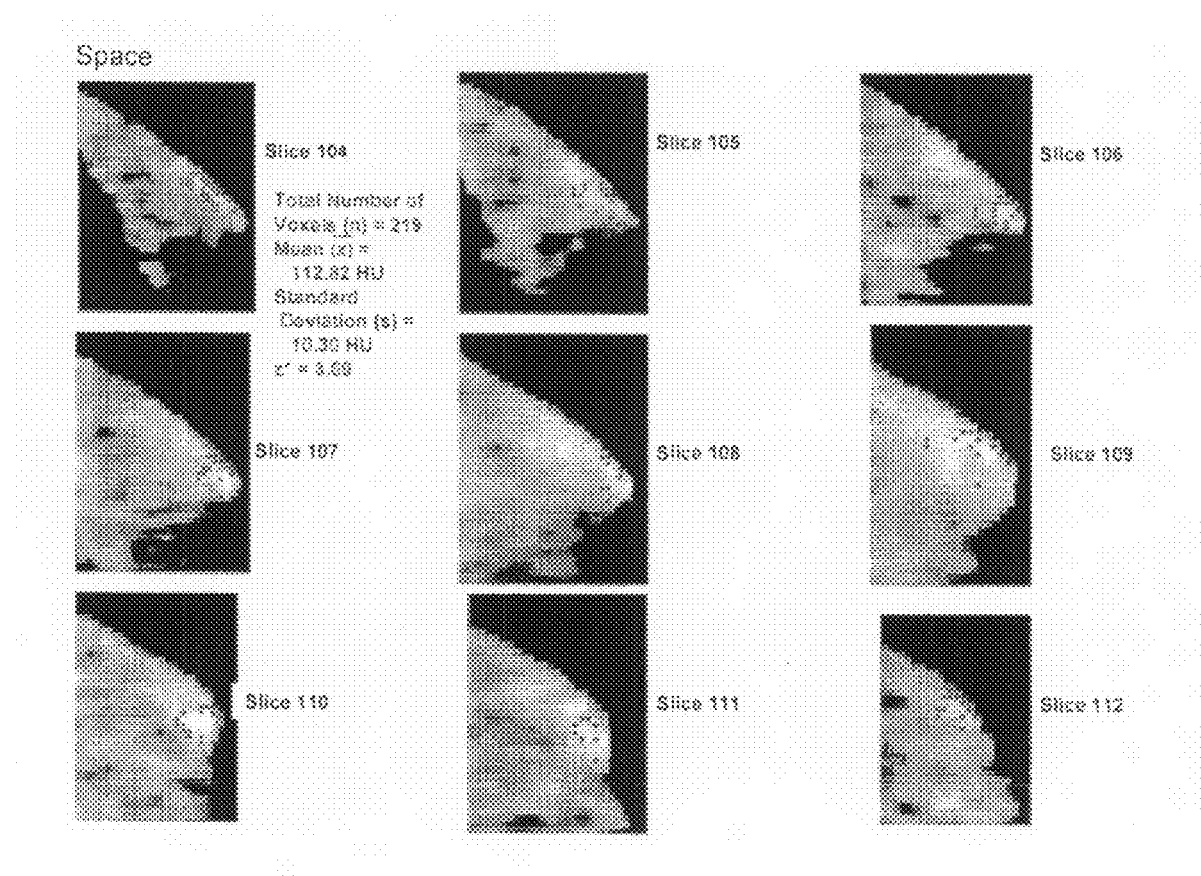
Figure 21:
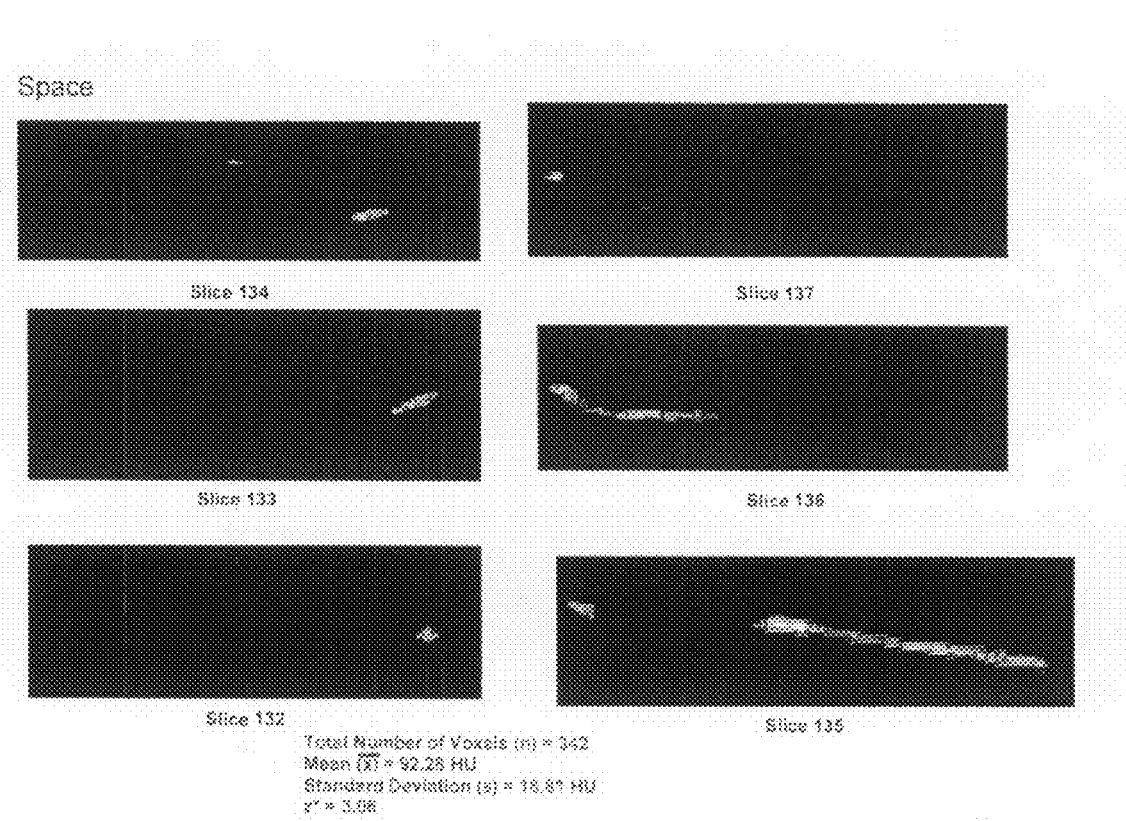
Figure 22:
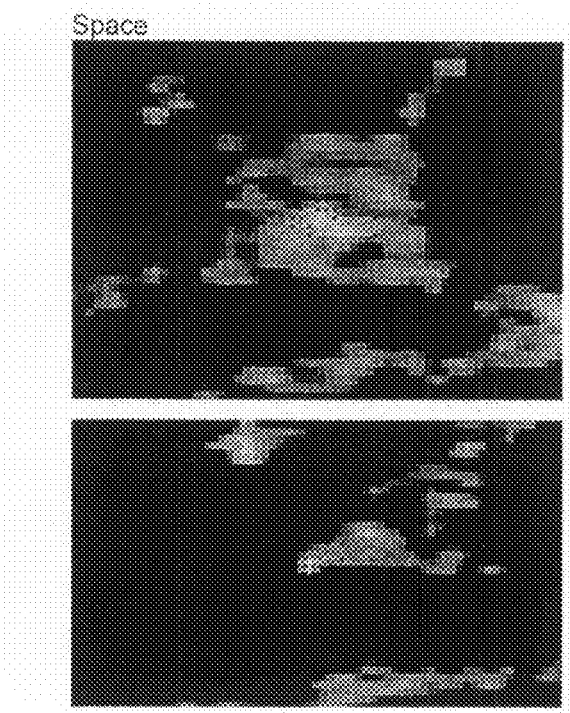

Any surface smoothing tool may be used in the invention. By way of example, Eclipse® software is available from Varian Medical Systems, Inc., Palo Alto, Calif. An Eclipse® level 4 (higher value means more smoothing) smoothing of the auto-segmentation perimeter of a suspect region of interest is shown in FIG. 15 slice image. For lower level 1 smoothing, this perimeter is much more ragged and rough. FIG. 16A portrays the differences between perimeters with low and high smoothing. If approximately equally spaced points are selected along the rough perimeter, FIG. 16B shows how a spacing value d (from rough to smoothed perimeter) is defined for each point by expanding a circle around each such point until the circle just touches the smoothed perimeter. A quantitive measure of roughness is then defined by calculating the mean squared "roughness" value $R^*$, from all the points along the rough perimeter. This $R^*$ measures a quantitative "roughness" metric that allows relative "roughness" to be quantified between two suspect regions-of-interest. The higher $R^*$ value, the more likely the suspect region-of-interest, is invasive as opposed to in-situ, cancer—a discriminator in breast cancer staging. To generalize this $R^*$ calculation, to auto-segmentation surfaces, with high and low smoothing, approximately equally spaced points are selected over the rougher surface, and spheres are constructed around each such point, with individual d radii so the sphere just touches the smoothed surface. This surface $R^*$ value is then just the mean square of all of these sphere radii. When low smoothing (e.g. Eclipse level 1) is used, just visual inspection of FIGS. 11, 13 and 14-type plots should discriminate the smooth (i.e. in-situ-like) from the rougher (i.e. invasive-like) lesions, for assistance in staging the "cancer-threat-like" level of the various suspect regions of interest.

In another preferred embodiment, the glandular region is auto-segmented. The distribution of the auto-segmented or rendered healthy glandular object is obtained. Further surface or volume rendering is then initiated with a bottom HU threshold being set at least one standard deviation above the glandular mean. This is for the whole 3D HU matrix data set as shown in FIG. 11. With a 0 voxel or pixel criterion, the bottom of this HU threshold is raised, until the known glandular region begins to break up into distinct and separate volumes. The threshold value is continuously raised until a majority of the rendered volumes are small and randomly scattered, as at the top left of FIG. 12. Then the minimum pixels area threshold or the minimum voxel volume threshold is applied, until most of the scattered and separate small volumes disappear. For the remaining larger volumes (e.g., up to 10 or 15), the HU distributions of all the voxels are obtained and their means calculated. From the latter means, the p or t* values are calculated, as described above, to identify those regions with very low probability of having come from the reference, healthy, glandular distribution. The expected results are sensitive detection of cancer with high specificity.

High contrast presentation is a preferred embodiment for identifying cancer suspect regions of interest, as illustrated in FIG. 17. FIGS. 17A, C and E are normal contrast images of slices 135, 105, and 123 respectively (out a total of 182 separate sagittal slice images in this CT data set for the second patient) with the brightness and contrast set to a minimum of −207 HU voxel values and to a maximum of +207 HU (using ImageJ CT image display software). The high contrast presentations of the same slices are shown in FIGS. 17B, D and F respectively, with the brightness and contrast set to a minimum of −22 HU and to a maximum of 135 HU. The latter are chosen in the upper range of the healthy glandular region, HU values distribution to preferentially highlight the regions with highest contrast enhancement. As seen, suspect regions marked A-E are easily identified, in addition to the largest lesion that was biopsy verified to be invasive ductal carcinoma. The hand segmentation of all (magnified) adjacent slices of suspect regions A, B, D and E are shown in FIGS. 18, 19, 20, 21, and 22 respectively, along with all the voxel HU values statistics of the combination of all the shown slices. The relative z* and t* and p rankings of all these suspect regions-of-interest are tabulated in Table 6. The relative ranking of all five regions-of-interest are shown with high z* and t* values and lower p values (compared to healthy glandular tissue parameter values) indicating higher suspicion of being cancer. Of interest is the z* 3.26 value of smallest suspect region-of-interest E that larger than that of region-of-interest D with a lower z* of 3.06. With the greatly varying number of voxels in each suspect region, the z* comparisons are more appropriate than trying to compare t* values that are directly proportional to $n^{1/2}$.

As an exemplary example above, hand rendering of suspect regions of interest were done on slices adjacent to strongly, contrast enhanced regions of interest. A preferred embodiment, would be for these suspect regions to be identified with autosegmentation (like FIGS. 11 and 13) and then the metrics of probability z*, size and surface roughness R*, computed automatically, using computer algorithms, as complementary methods of assessing the probability of cancer and their tendency to be either invasive or the lower risk in-situ. In fact, just using low smoothing of auto-segmented regions-of-interest alone, will provide visual comparative indications of invasiveness versus in-situ.

Another metric of risk of a suspect tissue part being cancer is the size of the part (the larger the size, the higher the risk), shown in Table 6 as the total number of voxels n, and their equivalent diameters, assuming each part is a sphere. The region D was clearly a linear feature and hence its length is also given in Table 6. Conveniently the CT data sets are referenced in 3 dimensional sets, so that the centers of each suspect region-of-interest can be specified, as shown in the last 3 columns of Table 6. The latter can be used to guide treatment or biopsy (and for subsequent comparisons for determining lesion size and shape changes including response to treatment), and assist in overall management of cancer disease.

cation task, the known signals are the HU distributions of the known healthy tissues consisting of adipose, glandular, and skin regions of a breast. A matched filter is used to prewhiten the underlying noise and cross correlate the observed signal with SKE (signal known exactly) from the healthy regions. The latter typically involves reversing the independent variable of the HU distribution of the SKE and convolving it with the HU distribution of the suspect region of interest. A high correlation means a greater probability that the ROI comes from a healthy tissue distribution. A low correlation means small probability that the region of interest is unlikely to have come from one of the healthy distributions, and is thus suspect of being cancer.

In one embodiment of the invention, the skewness of the acquired CT data sets in HU is used. Hand rendering and HU distribution acquisition of the type shown in FIGS. 8 and 9 were performed for 3 slices in front of and 3 slices behind a reference slice. The slices have been expanded somewhat in a volume. A summary of all the data compiled on these 7 slices are shown below in Table 7 for the IDC ROI and in Table 8 for the glandular ROI. Here, Slice 3F means the 3rd slice in front of the reference Slice 0. Slice 2B means the 2nd slice behind, etc. For all 7 measured slices, the measured mean, standard

TABLE 6

| Region Of Interest | z* | t* | p | No. Voxels | Equivalent Diameter Voxels | Equivalent Diameter (mm) | Length (mm) | Position x | Position y | Position z |
|---|---|---|---|---|---|---|---|---|---|---|
| A | 3.98 | 186 | $<10^{-300}$ | 2180 | 16.1 | 4.8 | — | 81.2 | 84.0 | 136 |
| B | 3.86 | 60.9 | $10^{-154}$ | 257 | 4.3 | 1.3 | — | 263 | 89.1 | 104 |
| C | 3.69 | 54.6 | $10^{-129}$ | 219 | 4.1 | 1.2 | — | 258 | 73.0 | 107 |
| D | 3.06 | 56.6 | $10^{-175}$ | 342 | 8.7 | 2.6 | 34 | 152 | 113 | 134 |
| E | 3.26 | 19.0 | $10^{-15}$ | 23 | 3.5 | 1.1 | — | 194 | 90.1 | 122 |

In further preferred embodiment, signal detection techniques (SDT) is used to confirm that a suspect region of interest does not come from a known healthy distribution. SDT technique is well known and summarized in a journal article by A. Burgess, Journal of the Optical Society of America, Vol. 16, 1999, pp. 633-646, the disclosure of which is incorporated herein by reference. For the cancer identification deviation σ, quartile data (Q1, Q2, and Q3), and voxel count in each region of interest are shown, along with some skewness measures, including the standard statistics, 3rd order, skewness expression and various ratios and difference values, that provide some indication of skewness. The mean and standard deviations of the seven measurements of each quantity are given at the bottom of Tables 7 and 8.

TABLE 7

| | Slice | Mean | σ | $Q_1$ | $Q_2$ | $Q_3$ | Skew | Voxels | $\frac{Q_3 - Q_2}{Q_2 - Q_1}$ | $\frac{Q_3 - \text{Mean}}{\text{Mean} - Q_1}$ | $Q_3 - \text{Mean}$ |
|---|---|---|---|---|---|---|---|---|---|---|---|
| IDC | 3F | 9.52 | 32.52 | −13.5 | 8.9 | 31.3 | −0.149 | 1294 | 1 | 0.946134 | 21.78 |
| | 2F | 44.16 | 32 | 23.1 | 43.9 | 64.8 | −0.153 | 1256 | 1.004808 | 0.980057 | 20.64 |
| | 1F | 44.15 | 27.3 | 27.8 | 46.9 | 64.2 | −0.029 | 1420 | 0.905759 | 1.2263 | 20.05 |
| | 0 | 54.4 | 25.58 | 37.3 | 54.8 | 70 | −0.115 | 1657 | 0.868571 | 0.912281 | 15.6 |
| | 1B | 47.43 | 36.36 | 24.5 | 48.8 | 72.3 | −0.333 | 2119 | 0.967078 | 1.084605 | 24.87 |
| | 2B | 53.38 | 28.71 | 35 | 52.5 | 72.1 | −0.125 | 1534 | 1.12 | 1.018498 | 18.72 |
| | 3B | 51.1 | 26.22 | 34.7 | 52.7 | 61.2 | −0.269 | 1163 | 0.472222 | 0.615854 | 10.1 |
| | Mean | 43.44857 | 29.81286 | 24.12857 | 44.07143 | 62.27143 | −0.15929 | 1491.857 | 0.905491 | 0.969104 | 18.82286 |
| | Std Dev | 15.51939 | 3.944062 | 17.48339 | 15.95835 | 14.30265 | −0.116152 | 324.1509 | 0.207239 | 0.187347 | 4.77155 |
| | p | 0.038242 | 0.996481 | 0.018777 | 0.050752 | 0.105475 | 0.183426 | | 0.429348 | 0.383066 | 0.996628 |

TABLE 8

|  | Slice | Mean | σ | $Q_1$ | $Q_2$ | $Q_3$ | Skew | Voxels | $\frac{Q_3 - Q_2}{Q_2 - Q_1}$ | $\frac{Q_3 - \text{Mean}}{\text{Mean} - Q_1}$ | $Q_3$ – Mean |
|---|---|---|---|---|---|---|---|---|---|---|---|
| Glan-dular | 3F | 15.59 | 38.69 | −11.9 | 15.1 | 41 | −0.135 | 13243 | 0.959259 | 0.924336 | 25.41 |
|  | 2F | 31.21 | 37.42 | 6.2 | 32.1 | 56.1 | −0.406 | 16293 | 0.926641 | 0.995202 | 24.89 |
|  | 1F | 29.65 | 36.87 | 5.3 | 32.8 | 54.5 | −0.509 | 21556 | 0.789091 | 1.020534 | 24.85 |
|  | 0 | 35.54 | 34.17 | 11.6 | 36.8 | 57.7 | −0.545 | 19952 | 0.829365 | 0.925647 | 22.16 |
|  | 1B | 33.26 | 36.19 | 8.1 | 34.1 | 57.7 | −0.284 | 17523 | 0.907692 | 0.971383 | 24.44 |
|  | 2B | 31.32 | 38.91 | 3.5 | 31.3 | 57.2 | −0.166 | 22082 | 0.931655 | 0.930266 | 25.88 |
|  | 3B | 30.69 | 35.24 | 6.2 | 30.9 | 53.5 | −0.206 | 20750 | 0.91498 | 0.931401 | 22.81 |
|  | Mean | 29.60857 | 36.78429 | 4.142857 | 30.44286 | 53.95714 | −0.32157 | 18771.29 | 0.894098 | 0.956967 | 24.34857 |
|  | Std Dev | 6.47688 | 1.738504 | 7.515064 | 7.052625 | 5.937412 | 0.166312 | 3221.98 | 0.06131 | 0.038993 | 1.365155 |

The standard deviations of the 7 measurements of parameters from the glandular data (bottom row of Table 8) were used to calculate the probability p of how likely the third from the last row of values of the IDC in Table 7 came by chance from the glandular distribution. This latter p value is given as the last row of Table 7. As expected the third column IDC mean value is statistically and significantly different from the glandular tissue with a value of 0.038 compared to a p threshold of <0.05. The most reliable indicator of skewness "difference" seems to be the formal skewness expression. It had a p value of 0.18, but only 7 samples were used. According to Yates et al., from 15 to 45 samples are needed to reliably evaluate skewness. With a total IDC population of over 10,000 voxels, this data set could easily be broken down into many more subsets (that the 7 achieved with separate slices).

From the foregoing it will be appreciated that although specific embodiments of the invention have been described herein for purposes of illustration, various modifications may be made without deviating from the spirit and scope of the invention.

What is claimed is:

1. A method comprising the steps of:
   receiving a volumetric data set obtained by an imaging system from an object, said data set comprising voxels each having a radiation attenuation coefficient value;
   defining a first region of interest comprising a population of voxels of a first tissue part of the object to obtain a first distribution of radiation attenuation coefficient values;
   defining a second region of interest comprising a sample of voxels of a second tissue part of the object to obtain a second distribution of radiation attenuation coefficient values;
   distinguishing the second tissue part from the first tissue part using the properties of the first and second distributions of radiation attenuation coefficient values;
   wherein said first region of interest comprising the population of voxels consists essentially of a known tissue part having the first distribution of radiation attenuation coefficient values with a known parameter, said second region of interest comprising the sample of voxels consists essentially of a tissue part suspect of being cancerous having the second distribution of radiation distribution coefficient values with a sample mean, and said distinguishing step comprises determining a probability value that said sample mean is from the first distribution of the known tissue part by chance.

2. The method of claim 1 in which said population of voxels of the first tissue part comprises voxel populations at least 10 times more than the sample of voxel populations of the second tissue part.

3. The method of claim 1 in which said population of voxels of the first tissue comprises more than 10,000 voxels.

4. The method of claim 1 in which said first region of interest consists essentially of healthy glandular tissue of a breast.

5. The method of claim 1 in which said first region of interest consists essentially of healthy adipose tissue of a breast.

6. The method of claim 1 in which said defining of the first region of interest and/or the second region of interest is carried out by segmentation.

7. The method of claim 1 in which said defining of the first region of interest and/or the second region of interest is carried out by auto-segmentation.

8. A method comprising the steps of:
   receiving a volumetric data set of an object obtained by an imaging system, said data set comprising voxels each having a radiation attenuation coefficient value;
   defining a first region of interest comprising a population of voxels of a first tissue part of the object to obtain a first distribution of radiation attenuation coefficient values;
   defining a second region of interest comprising a sample of voxels of a second tissue part of the object to obtain a second distribution of radiation attenuation coefficient values;
   distinguishing the second tissue part from the first tissue part using the properties of the first and second distributions of radiation attenuation coefficient values;
   said defining of the second region of interest is carried out by interrogating a region suspected of being cancer, with a voxel cube having dimensions ranging from 2 to 10 voxels on each side of the cube, over the volumetric data set matrix.

9. The method of claim 8 in which said defining of the second region of interest is carried out by interrogating a region suspected of being cancer, with a voxel cube having dimensions ranging from 7 to 10 voxels on each side of the cube, over the volumetric data set matrix.

10. The method of claim 1 in which said determining of probability value comprises calculating the mean t* value according to the following equation:

$$t^* = (x^* - \mu)(n)^{1/2}/\sigma$$

where $\mu$ is the mean value of the first distribution of attenuation coefficients of the voxel population, $\sigma$ is the standard deviation of the first distribution of attenuation coefficients of the voxel population, $x^*$ is the mean value of the second distribution of attenuation coefficients of the voxel sample, and n is the number of voxels in the second region of interest.

11. The method of claim 1 in which said determining of probability value comprises calculating the mean z* value according to the following equation:

$$z^* = (x^* - \mu)/\sigma$$

where μ is the mean value of the first distribution of attenuation coefficients of the voxel population, σ is the standard deviation of the first distribution of attenuation coefficients of the voxel population, and x* is the mean value of the second distribution of attenuation coefficients of the voxel sample.

12. A method comprising the steps of:
receiving a volumetric data set obtained by an X-ray imaging system from a human breast, the data set comprising voxels each having an X-ray attenuation coefficient values;
defining a first region of interest of a population of voxels consisting essentially of a known tissue of the breast to obtain a first distribution of X-ray attenuation coefficients;
defining a second region of interest of a sample of voxels consisting essentially of a tissue suspected of being cancer to obtain a second distribution of X-ray attenuation coefficient values;
calculating the mean value of the second distribution of the sample of voxels; and
determining a probability value that said sample mean of the second distribution is from the first distribution of the known tissue by chance.

13. The method of claim 12 in which said population of voxels of the first tissue comprises voxels at least 10 times more than the sample of voxels of the second tissue.

14. The method of claim 12 in which said known tissue is healthy glandular tissue of a breast.

15. The method of claim 12 in which said known tissue is healthy adipose tissue of a breast.

16. The method of claim 12 in which said defining of the first region of interest and/or the second region of interest is carried out by segmentation.

17. The method of claim 12 in which said defining of the first region of interest and/or the second region of interest is carried out by auto-segmentation.

18. The method of claim 12 in which said defining of the second region of interest is carried out by interrogating a region suspected of being cancer with a voxel cube having dimensions ranging from 2 to 10 voxels on each side of the cube over the volumetric data set matrix.

19. The method of claim 12 in which said defining of the second region of interest is carried out by interrogating a region suspected of being cancer with a voxel cube having dimensions ranging from 7 to 10 voxels on each side of the cube over the volumetric data set matrix.

20. The method of claim 12 in which said determining of probability value comprises calculating the mean t* value according to the following equation:

$$t^* = (x^* - \mu)(n)^{1/2}/\sigma$$

where μ is the mean value of the first distribution of attenuation coefficients of the voxel population, σ is the standard deviation of the first distribution of attenuation coefficients of the voxel population, x* is the mean value of the second distribution of attenuation coefficients of the voxel sample, and n is the number of voxels in the second region of interest.

21. The method of claim 12 in which said first region of interest comprises a population of voxels consisting essentially of a known tissue part having a first distribution of radiation attenuation coefficient values with a known parameter, said second region of interest comprises a sample of voxels consisting essentially of a tissue part, suspect of being a cancer having a second distribution of radiation distribution coefficient values with a sample mean, and said distinguishing step comprises displaying images at high contrast, chosen to highlight second regions, with brightness and contrast levels selected in the upper part of the distribution of a reference region, intended to preferentially shows those regions whose distributions, differ most from that of a reference region.

22. The method of claim 21 wherein the first region of interest is a reference, healthy glandular breast tissue part, and the second suspect regions of interest are selected by displaying images at high contrast, with maxima and minima chosen from the higher range of the reference distribution, such that breast regions of highest contrast enhancement, can be readily indentified, including identification by auto-segmentation.

23. The method of claim 22, where metrics of "probability by chance" z* and suspect regions-of-interest size, including total number of voxels, "spherical" diameter, and/or length, to rank the probability of cancer occurrence, where higher values indicate higher probability of being cancer.

24. The method of claim 21, where in auto-segmentation of surface rendering and high and low levels of segmentation smoothing are done, in a way that rouchness metrics R* can be calculated, to help discriminate between invasive and non invasive cancers, where the highest probability of being invasive corresponds to the higher R* values.

* * * * *